United States Patent
Gupta et al.

(10) Patent No.: US 7,493,413 B2
(45) Date of Patent: Feb. 17, 2009

(54) APIS TO BUILD PEER TO PEER MESSAGING APPLICATIONS

(75) Inventors: Ashish Gupta, Redmond, WA (US); Jeremy L. Dewey, Redmond, WA (US); Padmini Chandrasekhar Iyer, Redmond, WA (US); Ravi T. Rao, Redmond, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 11/080,897

(22) Filed: Mar. 15, 2005

(65) Prior Publication Data

US 2006/0212592 A1 Sep. 21, 2006

(51) Int. Cl.
*G06F 15/16* (2006.01)
(52) U.S. Cl. .................................... 709/238; 709/232
(58) Field of Classification Search ......... 709/200–202, 709/220–227, 232–241
See application file for complete search history.

(56) References Cited

U.S. PATENT DOCUMENTS

| | | | |
|---|---|---|---|
| 7,139,838 B1 * | 11/2006 | Squire et al. ................ 709/242 |
| 7,340,500 B2 * | 3/2008 | Traversat et al. ............ 709/201 |
| 2002/0112058 A1 | 8/2002 | Weisman et al. |
| 2002/0184310 A1 * | 12/2002 | Traversat et al. ............ 709/204 |
| 2003/0055892 A1 | 3/2003 | Huitema et al. |
| 2004/0111469 A1 | 6/2004 | Manion et al. |
| 2004/0148326 A1 * | 7/2004 | Nadgir et al. ............... 709/200 |
| 2004/0148333 A1 | 7/2004 | Manion et al. |
| 2004/0148611 A1 | 7/2004 | Manion et al. |
| 2004/0162871 A1 * | 8/2004 | Pabla et al. .................. 709/201 |
| 2005/0004916 A1 * | 1/2005 | Miller et al. ................... 707/10 |
| 2005/0193106 A1 * | 9/2005 | Desai et al. ................. 709/223 |
| 2007/0097885 A1 * | 5/2007 | Traversat et al. ............ 370/254 |

OTHER PUBLICATIONS

Chappell, D., "Introducing Indigo: An Early Look," Microsoft Corporation 2005, http://msdn.microsoft.com/library/en-us/dnlong/html/introindigov1-0.asp?frame=true, 18 pages.
Box, D., "Code Name Indigo: A Guide to Developing and Running Connected Systems with Indigo," Microsoft Corporation 2005, http://msdn.microsoft.com/msdnmag/issues/04/01/indigo/?print=true, 11 pages.
"Peer-to-Peer Infrastructure: PeerGroupEnumMembers," Microsoft,http://msdn.microsoft.com/library/en-us/p2psdk/p2p/peergroupenummembers.asp?frame=true.
"The Cable Guy - Nov. 2003: Windows Peer-to-Peer Networking," Microsoft Technet,http://www.microsoft.com/technet/community/columns/cableguy/cg1103.mspx.
"Peer-to-Peer Infrastructure: Identity Manager Functions," Microsoft, http://msdn.microsoft.com/library/en-us/p2psdk/p2p/identity_manager_functions.asp?frame.
"Peer-to-Peer Infrastructure: Creating a Group Chat Application," Microsoft,http://msdn.microsoft.com/library/en-us/p2psdk/p2p/creating_a_group_chat_application.asp . . . .

(Continued)

*Primary Examiner*—Moustafa M Meky
(74) *Attorney, Agent, or Firm*—Marshall, Gerstein & Borun LLP

(57) ABSTRACT

The claimed method and system is an API set to support a multicast programming model for implementation on top of a service oriented framework, specifically a service oriented messaging system.

20 Claims, 17 Drawing Sheets

OTHER PUBLICATIONS

"Peer-to-Peer Infrastructure: Grouping API Functions," Microsoft, http://msdn.microsoft.com/library/en-us/p2psdk/p2p/grouping_api_functions.asp?frame=true.

Loesing et al., An Implementation of Reliable Group Communication based on the Peer-toPeer Network JXTA, IEEE, 2005.

European Search Report for EP 06111103 dated Jul. 3, 2006.

* cited by examiner

An Example of a Service Oriented Messaging System

APIS TO BUILD PEER TO PEER MESSAGING APPLICATIONS

BACKGROUND

Group communication technologies on the Internet allow users with common interest to collaborate, share files, chat with one another, multi-cast audio and video for presentations and group meetings, and engage in multi-player gaming. Indeed, the ability for group formation in an ad hoc basis present significant advantages to allow users with common interests to gather in a virtual area or group that may be segregated from the general Internet population thereby facilitating useful discussion in collaboration between such like minded individuals. Currently, however, most group communication and formation takes place in a server centric environment whereby all communication flows to or through large central servers to which individuals may connect to join and participate in the group.

Peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a group peer-to-peer environment is not well established. However, individuals have grown accustomed to the benefits provided by such grouping technology in the server centric environment.

SUMMARY

The claimed method and system is an API set to support a multicast programming model for implementation on top of a service oriented framework, specifically a service oriented messaging system. It provides application-layer multicast capability without requiring an IP multicast infrastructure. The claimed system enables service oriented applications to implement multicasting communications easily and efficiently. Moreover, the claimed multicast method and system of the claims provides management processes for creating and maintaining mesh topologies for peer-to-peer applications that may enhance multicast processes. Some of these processes may include: a channel monitoring and delivery service; a flooding and filtering service; an advertising service; a connection maintenance service; a cross domain Internet wide mesh capability; and a serverless peer resolution service.

DRAWINGS

Figure 10:
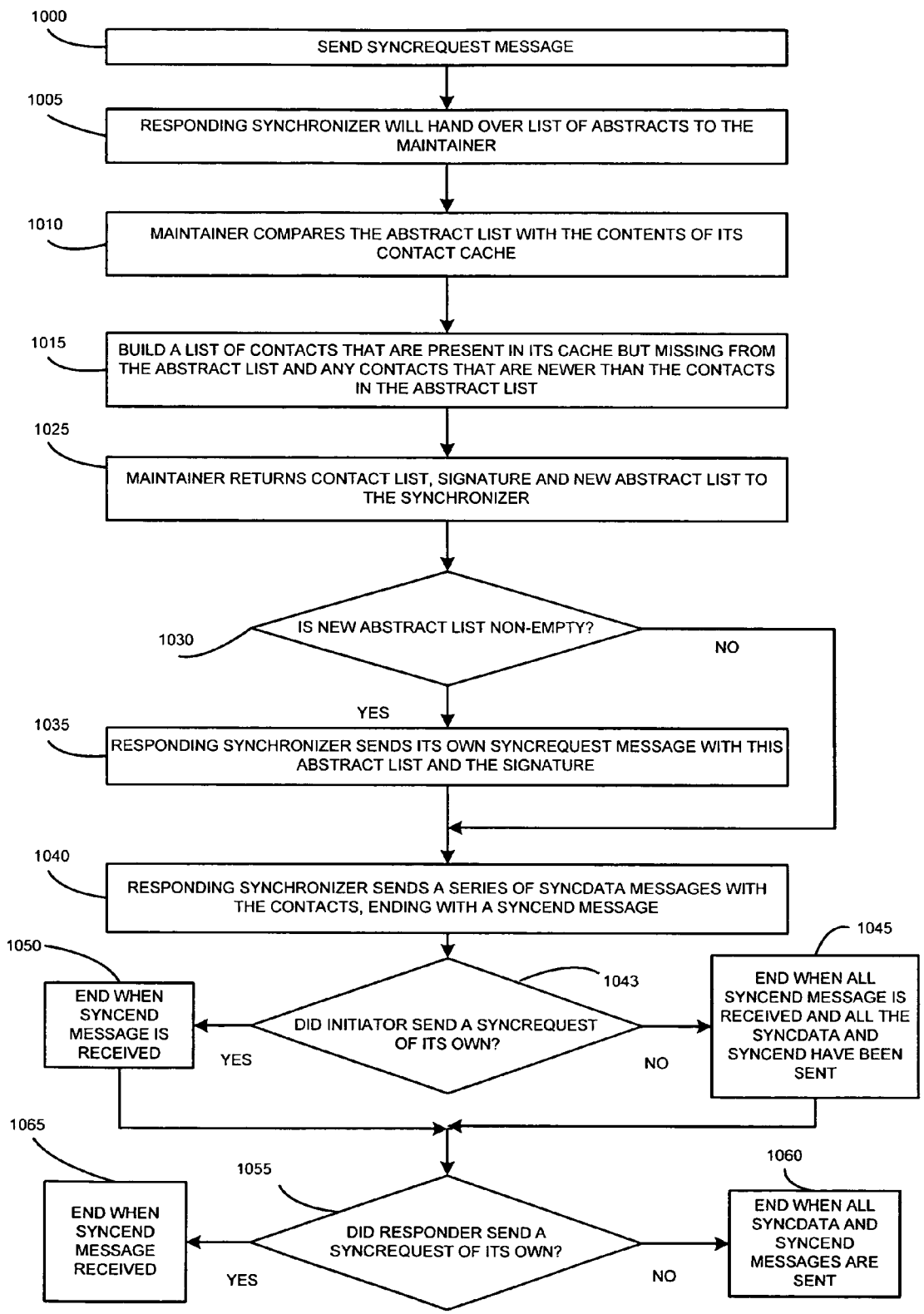
Figure 11:
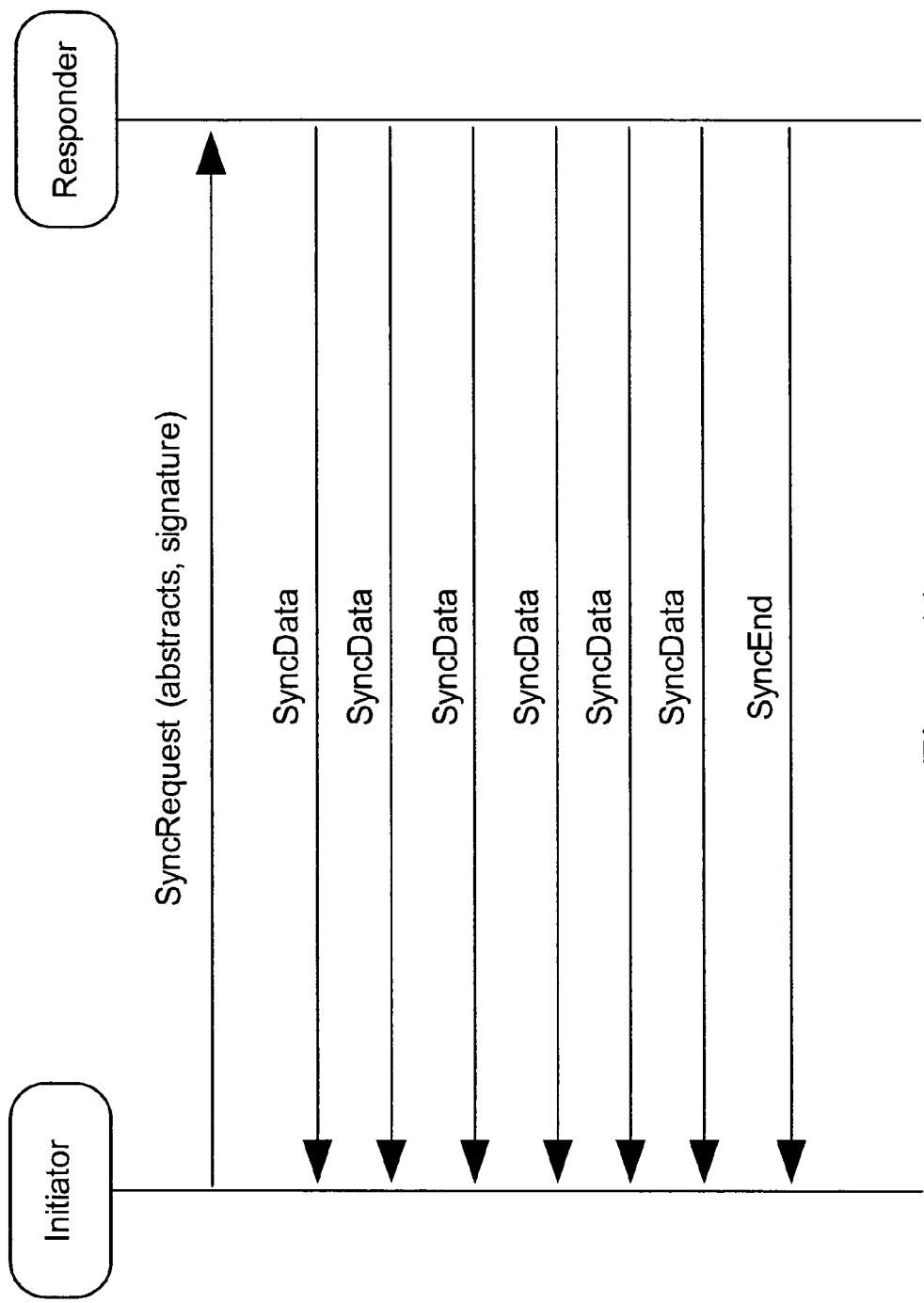
Figure 12:
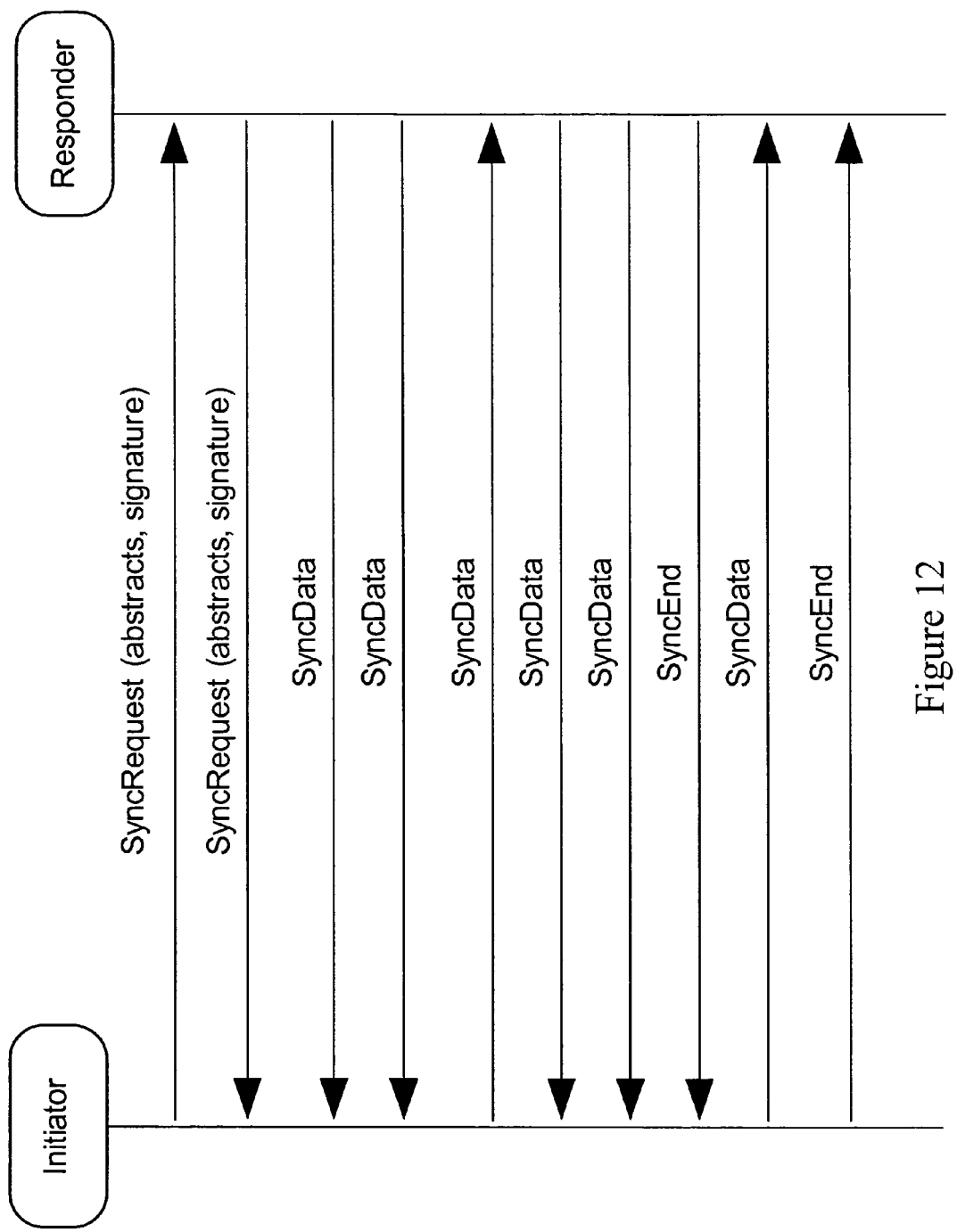
Figure 13:
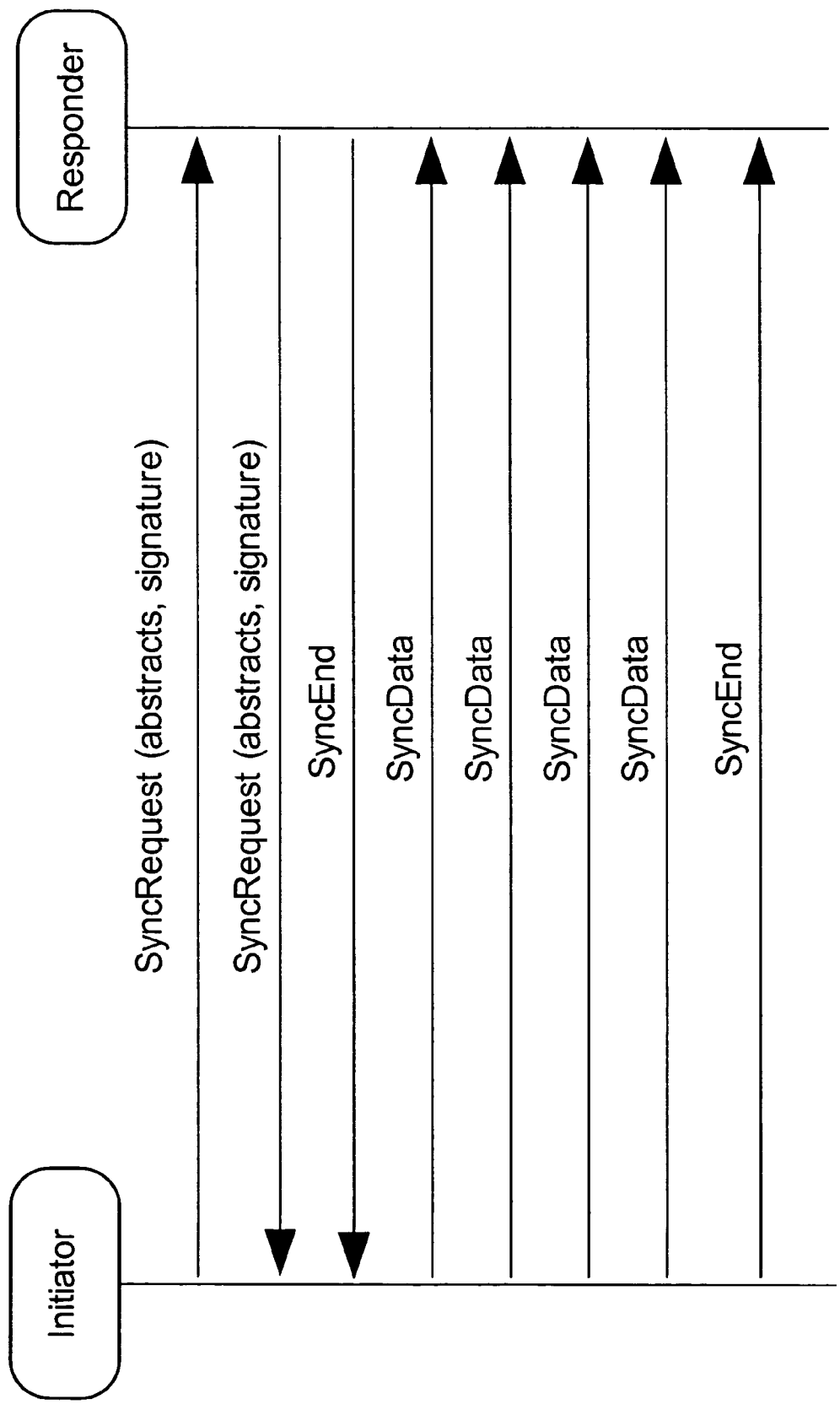
Figure 14:
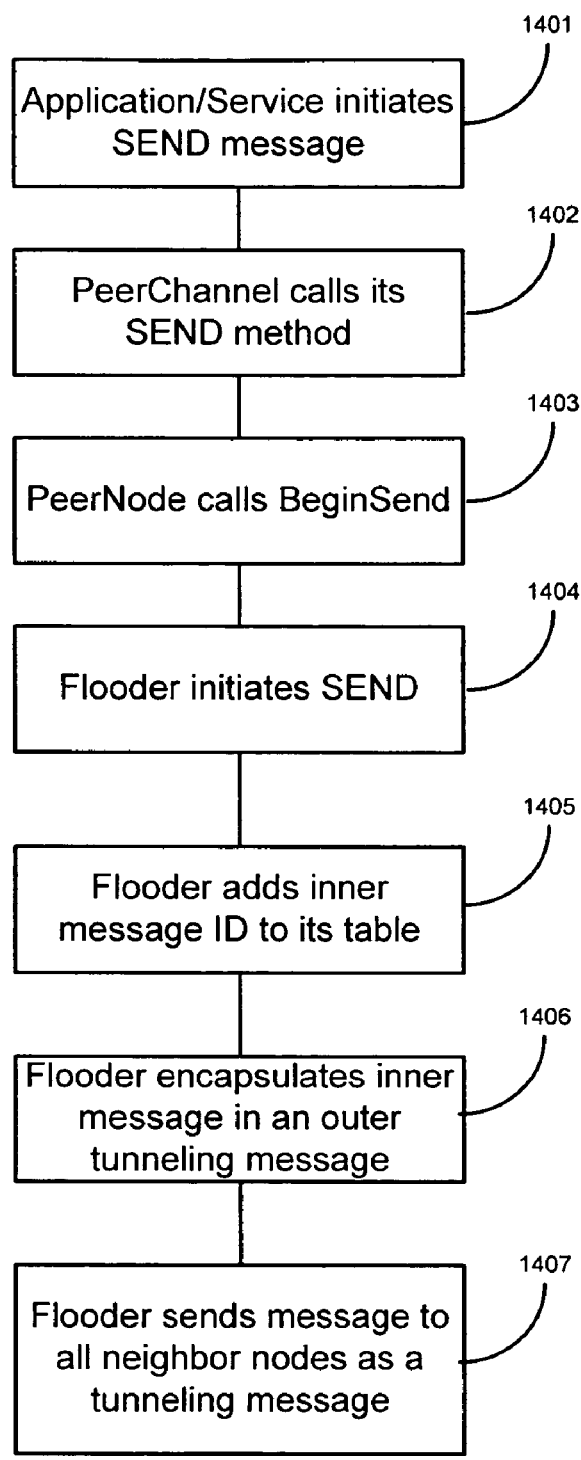
Figure 15:
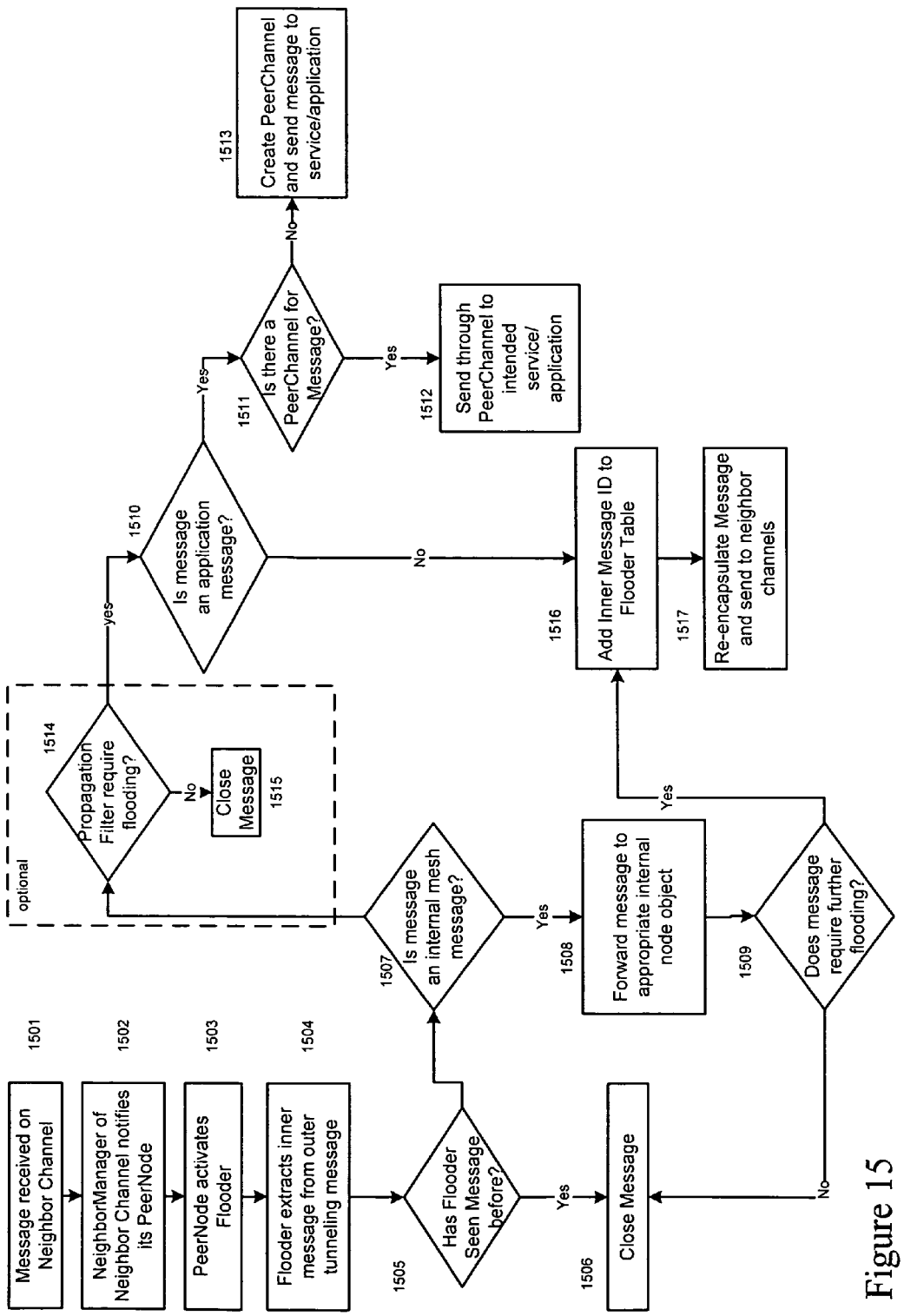
Figure 16:
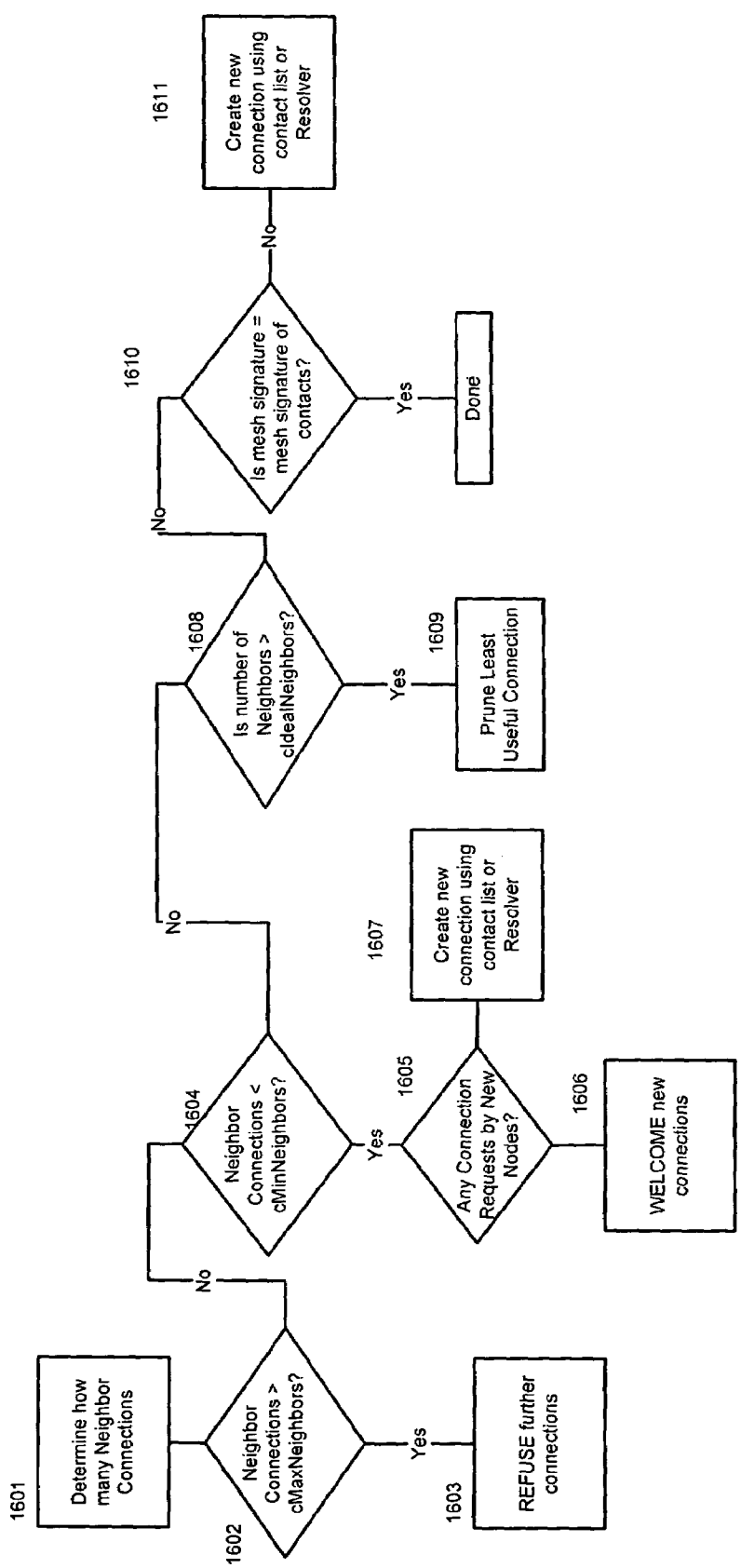
Figure 17:
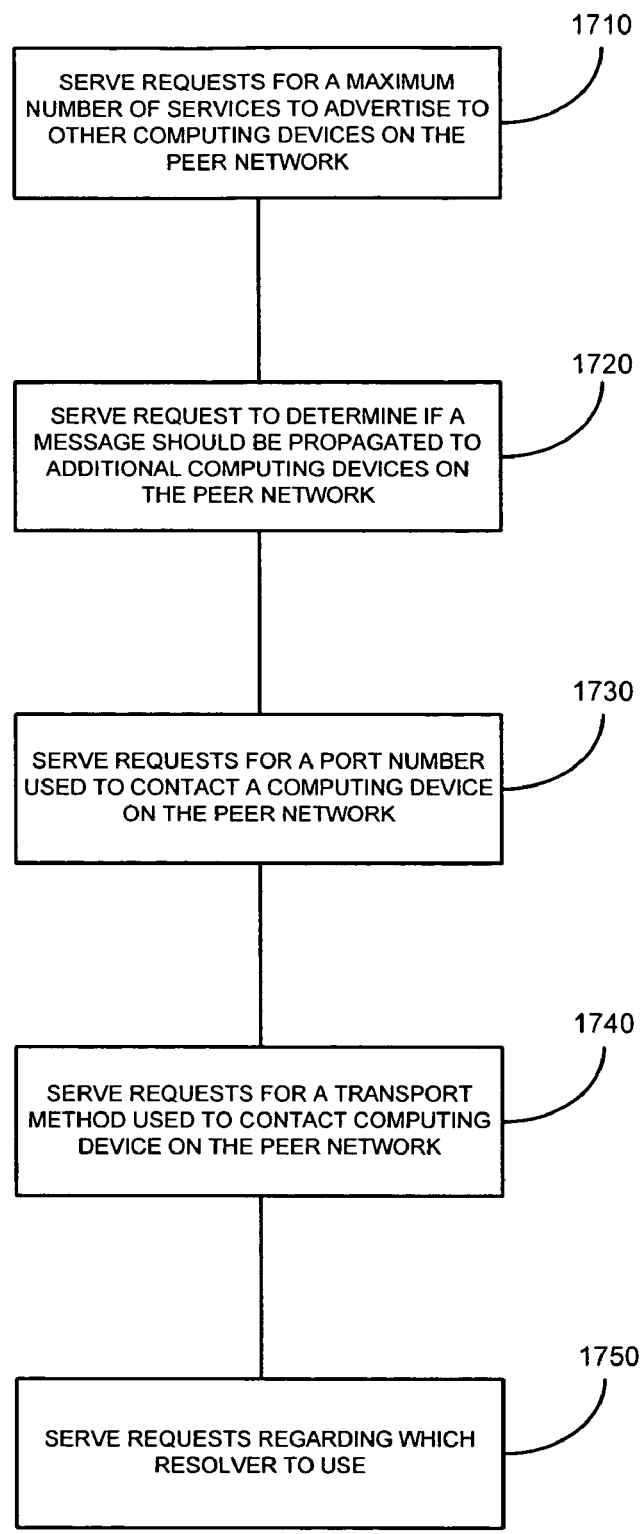

FIG. 10 may illustrate a synchronizer process in an embodiment of the claims;

FIG. 11 may illustrate the exchange of various synchronization related messages between a pair of neighbors, where the initiator is the new node;

FIG. 12 may illustrate the synchronization process between a pair of existing nodes in the mesh;

FIG. 13 may illustrate the synchronization process between an existing node and a new node, where the existing node is the initiator;

FIG. 14 may illustrate a general flooding process in an embodiment of the claims;

FIG. 15 illustrates a message handling process in an embodiment of the claims;

FIG. 16 illustrates a mesh management process in an embodiment of the claims; and FIG. 17 is flowchart of a method in accordance with the claims.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
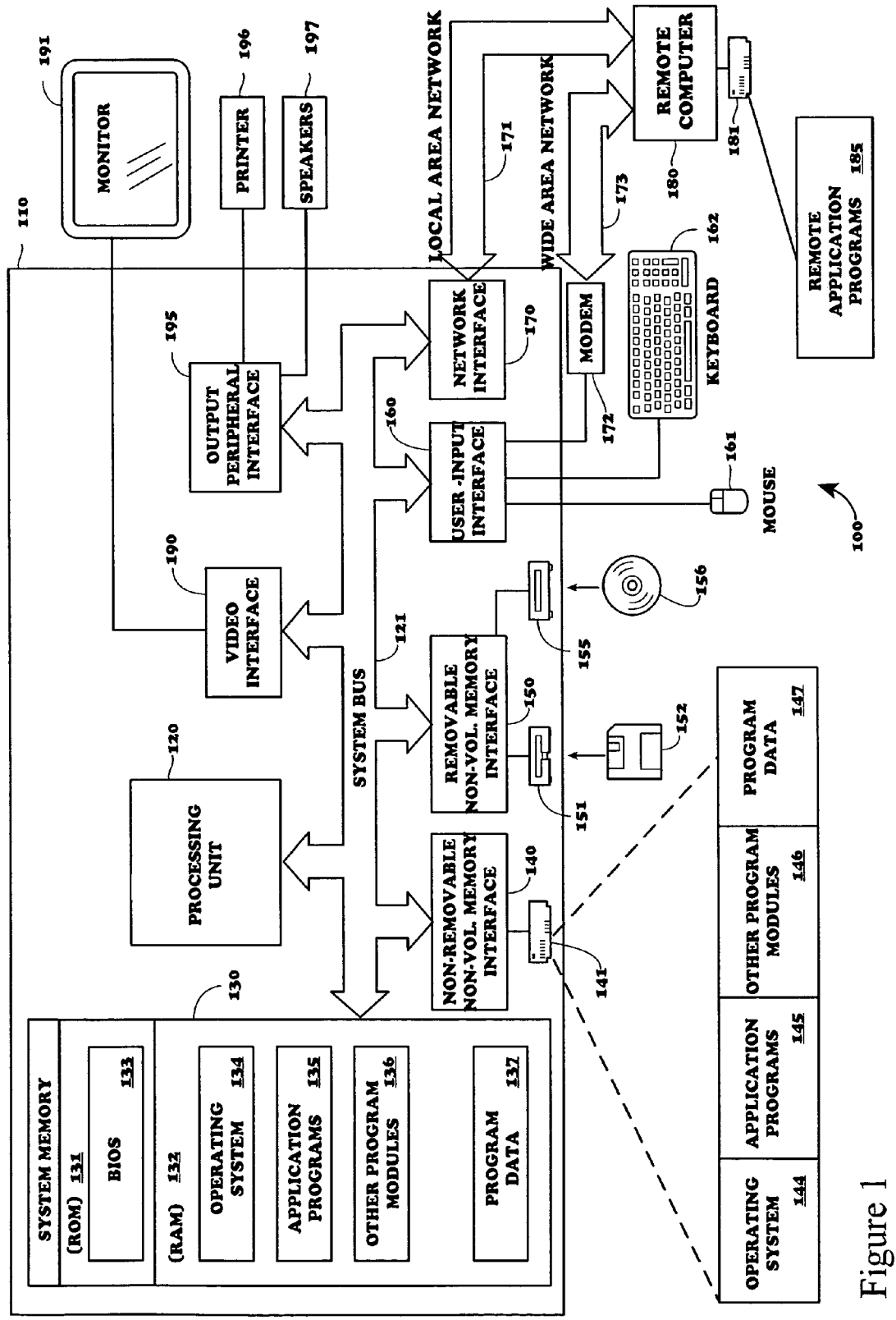
FIG. 1 is a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
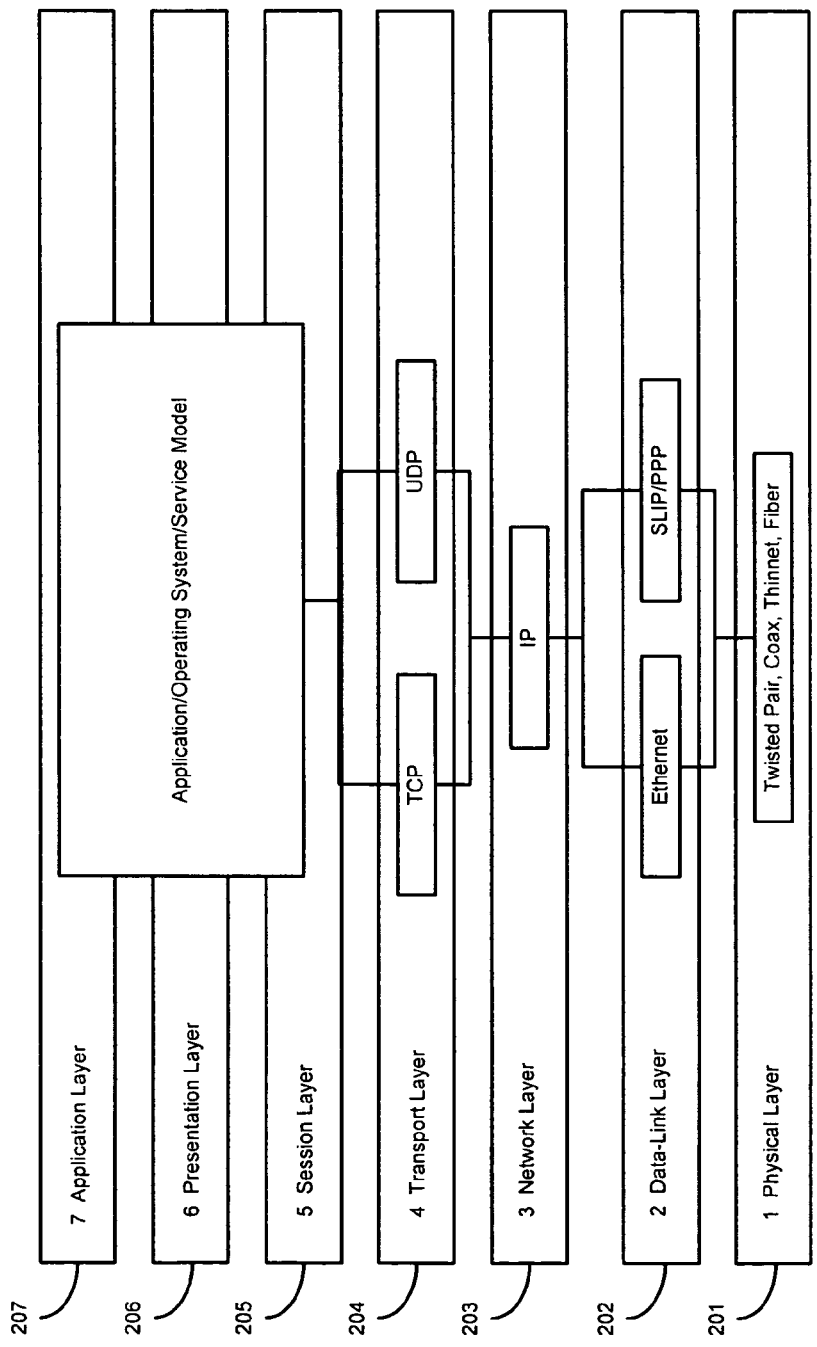
FIG. 2 illustrates a Open Systems Interconnection Model.

FIG. 2 illustrates an Open Systems Interconnection ("OSI") Model developed by the International Organization for Standardization ("ISO"), which may be used to describe an aspect of the method and system of the claims. OSI is a standard description for how messages may be transmitted between any two points in a telecommunication network.

According to the OSI model, the process of communication between two end points in a telecommunication network may be divided into layers, with each layer adding its own set of special, related functions. A communicating computer may be equipped with these seven layers of function. In communicating a given message between users, there may be a flow of data through each layer at one end down through the layers in that computer and, at the other end, when the message arrives, another flow of data up through the layers in the receiving computer and ultimately to the end user or program. The actual programming and hardware that furnishes these seven layers of function is usually a combination of the computer operating system, applications, Transmission Control Protocol ("TCP")/Internet Protocol ("IP") or alternative transport and network protocols, and the software and hardware that enables a signal to be placed on one of the lines attached to the computer.

OSI divides communication into seven layers. The layers are in two groups. The upper layers 209 are used whenever a message passes from or to a user and the lower layers 208 are used when any message passes through the host computer. Messages intended for this computer pass to the upper layers 209. Messages destined for some other host are not passed up to the upper layers but are forwarded to another host. The seven layers are briefly described as follows.

The physical layer 201 defines the physical characteristics of the interface, such as mechanical components and connectors, electrical aspects such as voltage levels representing binary values, and functional aspects such as setting up, maintaining, and taking down the physical link. Well-known physical layer interfaces for data communication include serial interfaces, parallel interfaces, and the physical specifications for LAN systems such as Ethernet and token ring.

The data link layer 202 defines the rules for sending and receiving information across a physical connection between two systems. Data links are typically network segments (not inter-networks) and point-to-point links. Data is packaged into frames for transport across the underlying physical network. Some reliability functions may be used, such as acknowledgment of received data.

The Network Layer 203 provides inter-networking services that deliver data across multiple networks. An internetwork addressing scheme assigns each network and each node a unique address. The network layer supports multiple data link connections. In the Internet Protocol suite, IP is the network layer internetworking protocol.

The Transport Layer 204 provides end-to-end communication services and ensures that data is reliably delivered between those end systems. Both end systems establish a connection and engage in a dialog to track the delivery of packets across a network. The protocol also regulates the flow of packets to accommodate slow receivers and ensures that the transmission is not completely halted if a disruption in the link occurs. Transmission Control Protocol, ("TCP") may be a transport layer protocol.

The Session Layer 205 coordinates the exchange of information between systems by using conversational techniques, or dialogs. Dialogs are not always required, but some applications may require a way of knowing where to restart the transmission of data if a connection is temporarily lost, or may require a periodic dialog to indicate the end of one data set and the start of a new one.

The Presentation Layer 206 contains protocols that are part of the operating system and application the user runs on a workstation. Information is formatted for display or printing in this layer. Codes within the data are interpreted, and data encryption and translation are also handled in this layer.

The Application Layer 207 provides defined procedures for accessing the underlying network services. The application layer is used to define a range of user applications.

While multicasting technologies are being developed for the lower levels 208 of the OSI model, i.e., the transport/networking layers, the claimed system focuses in on providing an application-level programming model for implementing multicasting at the upper levels 209 of the OSI model. Thus, using the method and system of the claims, a developer may implement multicasting functionality without requiring an IP multicast infrastructure. Moreover, the claimed system may improve a services oriented programming model, which is described below.

Service Oriented Frameworks and Programming Models

Service-orientation may differ from object-orientation primarily in how service oriented frameworks define "application." Object-oriented development may focus on applications that are built from interdependent class libraries, whereas service-oriented development may focus on systems that are built from a set of autonomous services. A service may simply be a program that one interacts with via message exchanges. However, unlike existing distributed object technologies, services may interact with their clients only through a well-defined XML interface. Behaviors such as passing complete classes, methods and calls, across service boundaries may not be allowed. Thus, application developers and system integrators may not require specific knowledge of the underlying object models, type systems and protocols of the software being integrated.

Instead of integrating disparate applications via direct object activations as in distributed object systems, applications may expose a set of "services" that other applications can utilize. Applications utilizing the services framework may expose their services using standards-based protocols and policy definitions that can be dynamically acquired. This uncoupling of the applications that make up connected systems may enable simpler integration, more flexibility in adapting systems to changes over time, and also may enable more reliable operations.

Figure 3:
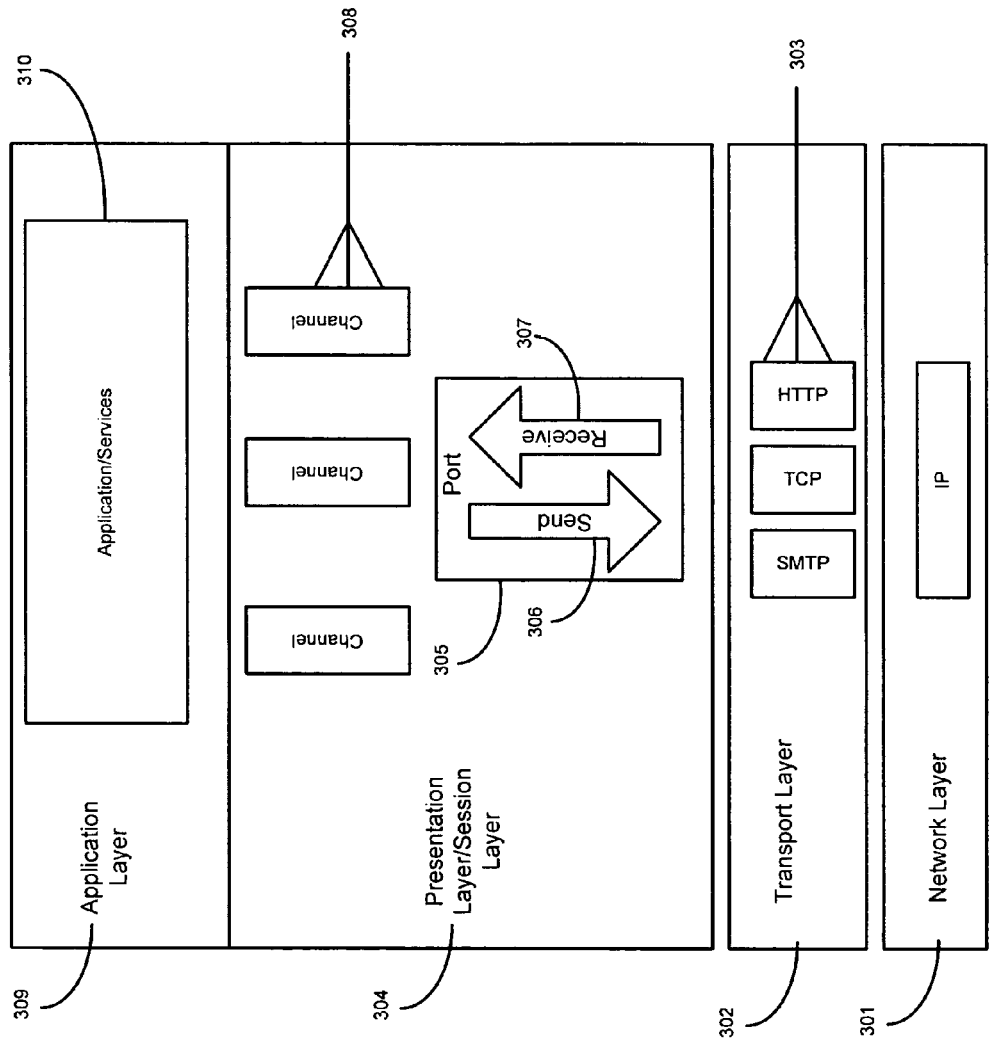
FIG. 3 illustrates a possible service oriented messaging system in which the claimed system may be built upon.

Existing service oriented programming models may implement an existing upper-OSI level messaging service, such as Simple Object Access Protocol ("SOAP"). SOAP may operate as an upper level OSI service that provides a schema for messages. One possible embodiment of a messaging system that utilizes the SOAP protocol is illustrated in FIG. 3. The illustrated messaging architecture, (hereinafter, "Message Bus") may be viewed as an application programming interface ("API") for simplifying the development and maintenance of a SOAP node. The claimed system and method may be implemented on any service oriented model providing basic upper-level message handling, but for the purposes of demonstration, the claimed method and system will be described using the Message Bus illustrated in FIG. 3.

As illustrated in FIG. 3, the Message Bus networking layer 301 and transport 302 may consist of any of the typical transport layer/networking layer protocols in existence. TCP/IP is a popular transport layer/networking layer protocol and may not need to be IP multicast enabled, which is an advantage of using the application-level multicast system of the claims. The transport layer may encapsulate a networking mechanism such as an IP socket, or named pipe, or any mechanism by which data may be communicated. Message Bus transports 303 may translate messages into actual bytes to be communicated on the wire via the data-link and physical layers.

Moving up to the Presentation/Session Layer 304, a port object 305 may represent a configurable, logical conduit for messages. Each port object 305 has a collection of transports 303 that the port uses to translate logical messages into actual network communication. Ports are internally implemented as a pair of pipeline objects: a send pipeline 306 and a receive pipeline 307. Each pipeline may support pluggable message handlers (not shown), constituting port extensions, which can inspect and manipulate messages traveling along the pipeline. A typical node in an application using the Message Bus may instantiate only a single Port object, although it is possible to create more than one. The remainder of this description will refer to ports in effort to assist the user conceptualize the description, but the use of ports may not be necessary in a modem message bus architecture.

At the application layer 309, application code 310 may send messages to a port object via a channel object 308. Channel objects come in a variety of embodiments, which may be narrowed down to two sets: send channels and receive channels. A single channel class may also implement both a send and a receive channel.

The Message Bus may support a variety of channel implementations to allow for a variety of message exchange patterns. For example, a simple channel for one-way datagram-style messages may just represent an ultimate receiver. On the other hand, a more complex channel may support correlated two way messaging, reliable messaging or message durability across executions of the application. The channel is the first point at which a Message object created by application code may be handed to infrastructure code (e.g., IP), and from the perspective of the application code, the channel is the first point of extensibility in the Message Bus architecture.

The general process of sending and receiving a message using the Message Bus Framework may be as follows.
1. A Message object is created by the initial sender.
2. A message is sent by passing a reference to the Message object to a channel.
3. The channel passes the message to the port object with which the channel is associated.
4. The port injects the message into the port's send pipeline where the message is processed serially by each message handler registered with the pipeline.
5. When the message reaches the end of the send pipeline, the port passes the message reference to a transport object registered with the port. The transport object is selected based on the address of the next hop for the message.
6. The transport layer formats the message into a stream of bytes and pushes the bytes onto the network.

At this point the message has left the SOAP node and has entered a network cloud. Until the message reaches the next SOAP node in its journey, the message is no longer subject to the Message Bus or SOAP. Instead, the message may be a stream of bytes passing through a networking protocol such as TCP/IP or HTTP.

At some point the bytes of the message reach a listening node on the network that is a SOAP node. The following may take place at the listening node.
1. A transport-derived object receives a stream of bytes from which it creates a Message object in memory. Message headers are read entirely into memory, however, the message content remains in the transport and possibly on the wire until it is needed.
2. The transport then passes the Message reference into the receive pipeline of the Port with which the Transport object is registered.
3. The message is processed serially by each message handler registered with the receive pipeline. If a message handler chooses to, it can pull the message from receive pipeline, and pass it to a channel associated with the message handler.
4. If the message makes it to the end of the receive pipeline on the port, the port passes the message to an application-defined message handler registered with the port's main receive channel.
5. Application code has a reference to the Message object, with which it may do what it pleases. Typically the action-header of the message is checked, and the content of the message is processed.
6. Once the application code is finished with the message, the Message Bus reads and throws away any unread bytes left in the message content to clear out the transport and the Message object is left for garbage collection.
7. If the message passed through a SOAP intermediary on its way from the initial sender to the ultimate receiver, then the intermediary also processes the message using the receiving steps as well as the sending steps as previously outlined. An intermediary is a node that is both a sender and a receiver of a single message. A SOAP router is a common example of an intermediary.

Figure 4:
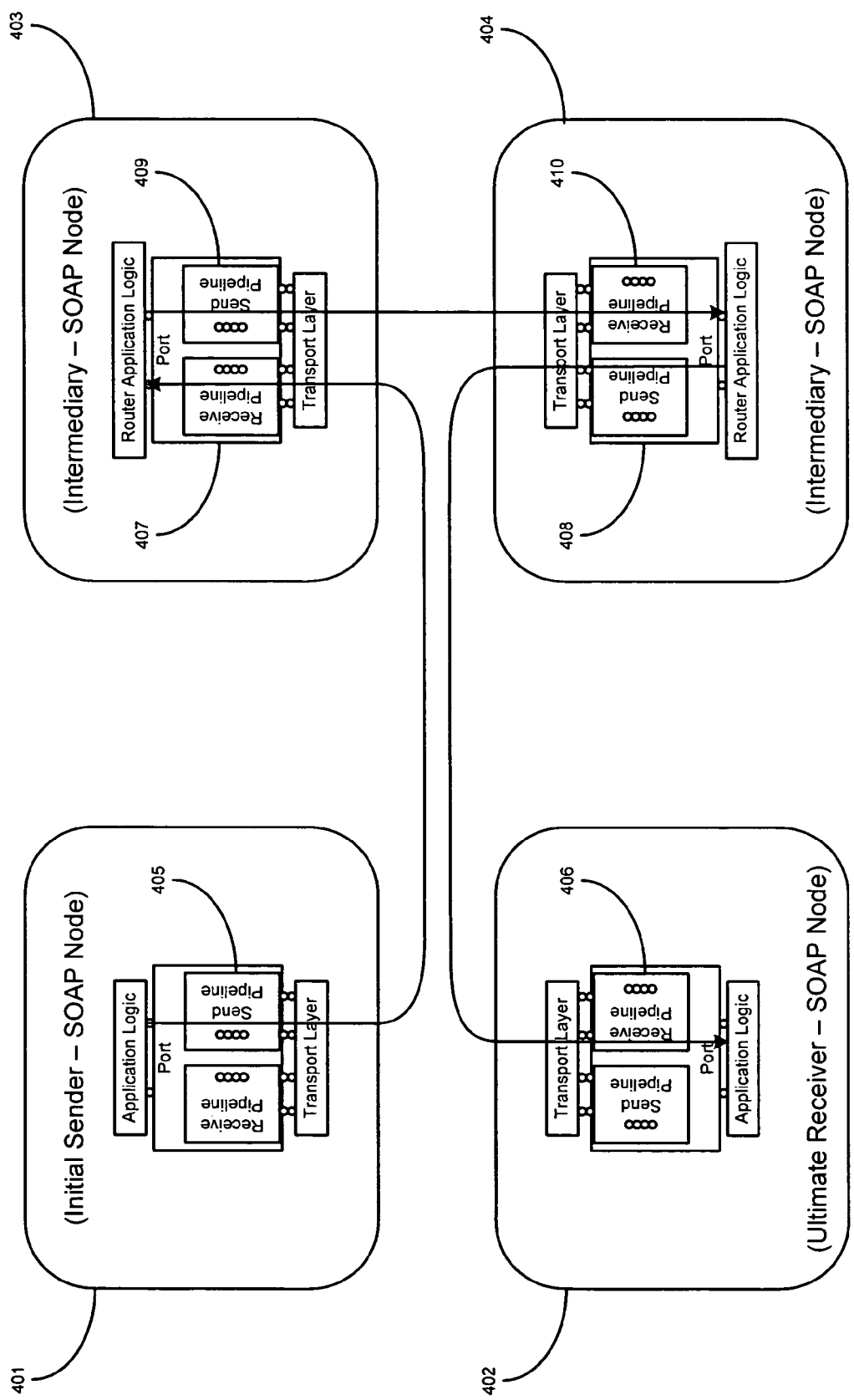
FIG. 4 illustrates message communications using the messaging system of FIG. 3.

FIG. 4 illustrates the path that a message may take from initial sender 401 to ultimate receiver 402 through two intermediaries 403, 404. The figure illustrates that only the send pipeline 405 may be utilized by the initial sender 401, and only the receive pipeline 406 is used by the ultimate receiver. Meanwhile, with the intermediaries 403, 404, both the send 407, 408 and receive pipelines 409, 410 are utilized in processing the message. Note that the roles of initial sender and ultimate receiver would be swapped in the journey of a response message.

While the Message Bus framework provides a basic mechanism for implementing services using a service oriented framework, there is no provision for enabling multicast functionality. The claimed method and system builds upon such a service oriented Message Bus architecture to provide developers the capability of building on top of the service oriented model to add multicasting functionality to their applications.

Multicast Mesh Systems

Figure 5:
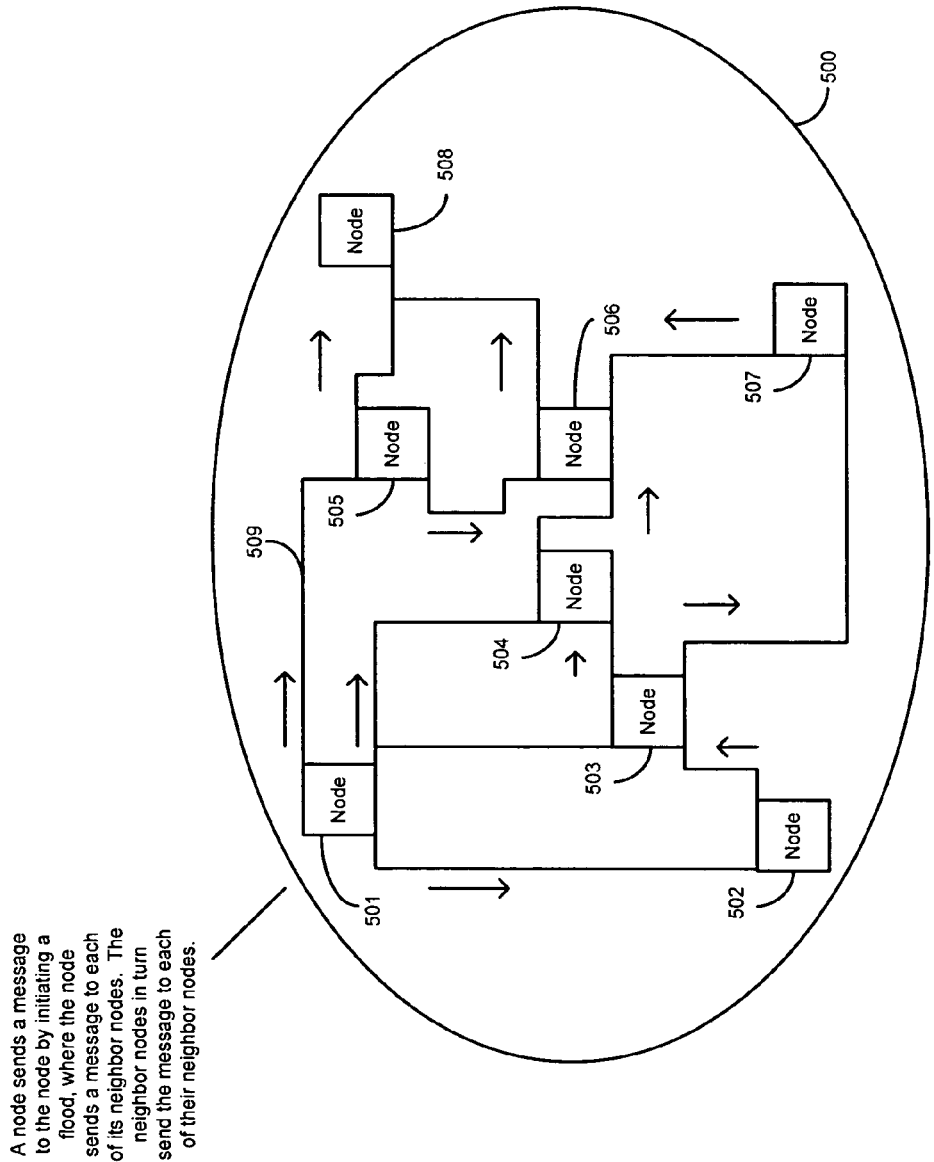
FIG. 5 illustrates a multicasting mesh topology.

The claimed system and method may implement a particular multicast topology known as a mesh. FIG. 5 illustrates a possible mesh topology. Generally, a member of a multicast group may be referred to as a node 501 and the group may be considered a mesh 500 and is represented by a set of nodes 501-508 that are interconnected to each other using communication channels, e.g., 509. Each node 501-508 in the mesh may be able to communicate a message to each and every other node in the mesh through a propagation process, in which each message sent by one node, e.g., node 501, is passed on to neighboring nodes 502-505, which continue passing them on to their neighbor nodes until each node receives the message. When a node has multiple connections, it may receive a message and make copies of the message for sending along each channel connected to it. Because the direction of propagation generally flows away from the message sender and resembles physical flooding, the propagation of messages using multicasting is generally called flooding. Each node in a multicast mesh may receive and be knowledgeable of any messages flooded on the network, i.e., what one node knows via a flooded message, every node in the mesh knows. Accordingly, it may be beneficial to have a mesh of a reasonable size or rules regarding when messages should continue-to be flooded.

Multicast Mesh Embodiment Using a Service Oriented Messaging System

Figure 6:
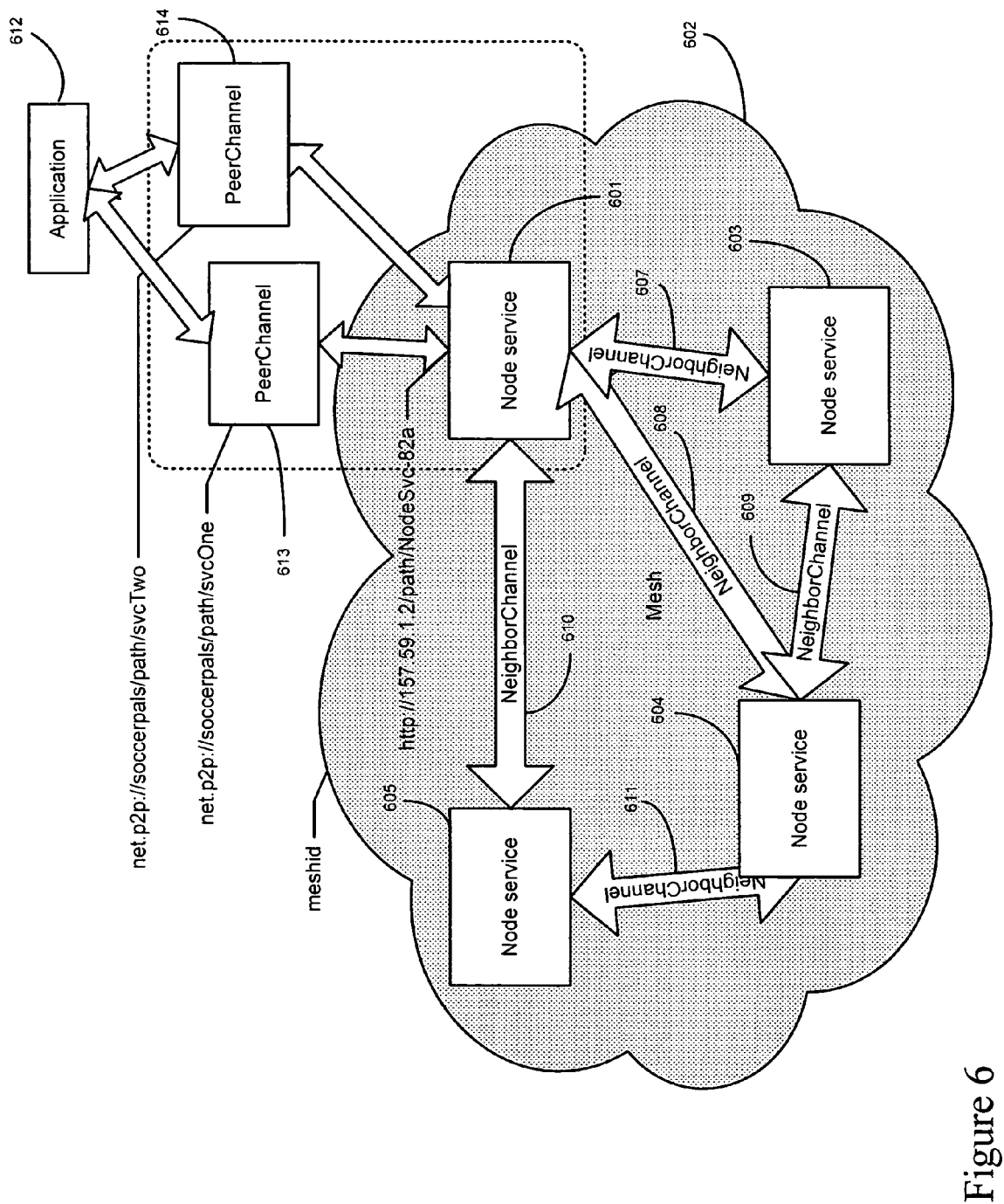
FIG. 6 illustrates a logical mesh embodiment of the claimed system.

FIG. 6, illustrate a general embodiment of the claimed multicast mesh system. In this embodiment, a peer node 601 is a node connected to a mesh 602. A mesh may be a named set of peer nodes 601-605 that are multiply connected by neighbor channels 607-611 to form a coupled network of nodes for the purposes of propagating data in the form of messages or point-to-point data streams. The mesh is built based on connections to neighbor nodes, where a neighbor node in a mesh is a peer node that is one communication link away (is directly connected via a communication channel).

A peer node may be associated with an instance of an application 612 coupled to a mesh 602. A peer channel 613, 614 may be considered a specific channel to a peer node for communication between an application 612, or service (in service oriented language), and a mesh 602 via a peer node 601 of the mesh. An application may create a node but a node cannot create an application. The application may create multiple nodes and each node may host multiple services. For example, consider a Chat application. The Chat application may create a node in a mesh called ChatMesh. It may create two different services, VideoService and TextService. Any text messages sent may be delivered to TextService and any video messages sent may be delivered to VideoService.

When initially connecting to a mesh, a peer node 601 may connect to another peer node, e.g., 603, that is already connected to the mesh. The connecting peer node 601 may determine the address of the neighbor node 603 connected to the mesh and send the neighbor node a solicitation to join the mesh. After connecting to the mesh, the new peer node 601 may create connections 608, 610 to additional neighbors, e.g., 604, 605 within the mesh.

The purpose of a mesh may be to create a logical topology for the flooding of messages to all mesh nodes. To automatically achieve the optimal topology for flooding, the mesh may maintain a signature, a set of contact nodes, and evaluates duplicate flooded messages to determine which neighbors are more efficient. Over time, connections may be created and removed so that the mesh converges to a topology that is optimal for flooding.

When a node disconnects from a mesh, it may potentially create a break in the mesh known as a mesh partition. Peer nodes use a mesh signature (to be described below) and mesh contact information to detect and repair a graph partition.

The peer channels 613, 614 may be communication channels that send and receive between the application 612 and a peer node 601. They may appear to the application as multicast channels, without requiring an IP enabled multicasting infrastructure. Each peer channel 613, 614 may be associated with a peer node 601. The peer node 601 may be responsible for implementing the mesh algorithms (e.g., optimization, partition detection and repair) and flooding messages throughout the mesh. Each peer node may provide its own service, called a node service, which interacts with a set of neighboring node services using reliable Message Bus channels. This node service may be implemented on top of the service framework and uses reliable channels over TCP and HTTP transport, for example.

Messages sent on a peer channel may be destined to a particular service offered by another node in the mesh. Every node in the mesh may receive a copy of each message sent on the mesh. When a node receives a message, it may deliver it to any associated peer channels which implement the message's intended service. In order to propagate the message to each node in the mesh, the originating node may send the message to each of its neighbors. Those neighbors may pass it on to their neighbors, and so forth. The actual flooding algorithm is described below.

An application message may be tunneled from one neighbor peer node 601 to another 602, for example, by encapsulating the application message, or inner message, in another outer message addressed to the node's neighbor. A new outer message may be created per neighbor. In this way, the original message, including its destination service address, may remain unchanged from node to node. All nodes may be reachable from all other nodes. To the extent to which this is not true (e.g., nodes being behind untraversable firewalls), the resilience of the mesh degrades.

Object Model Embodiment

Figure 7:
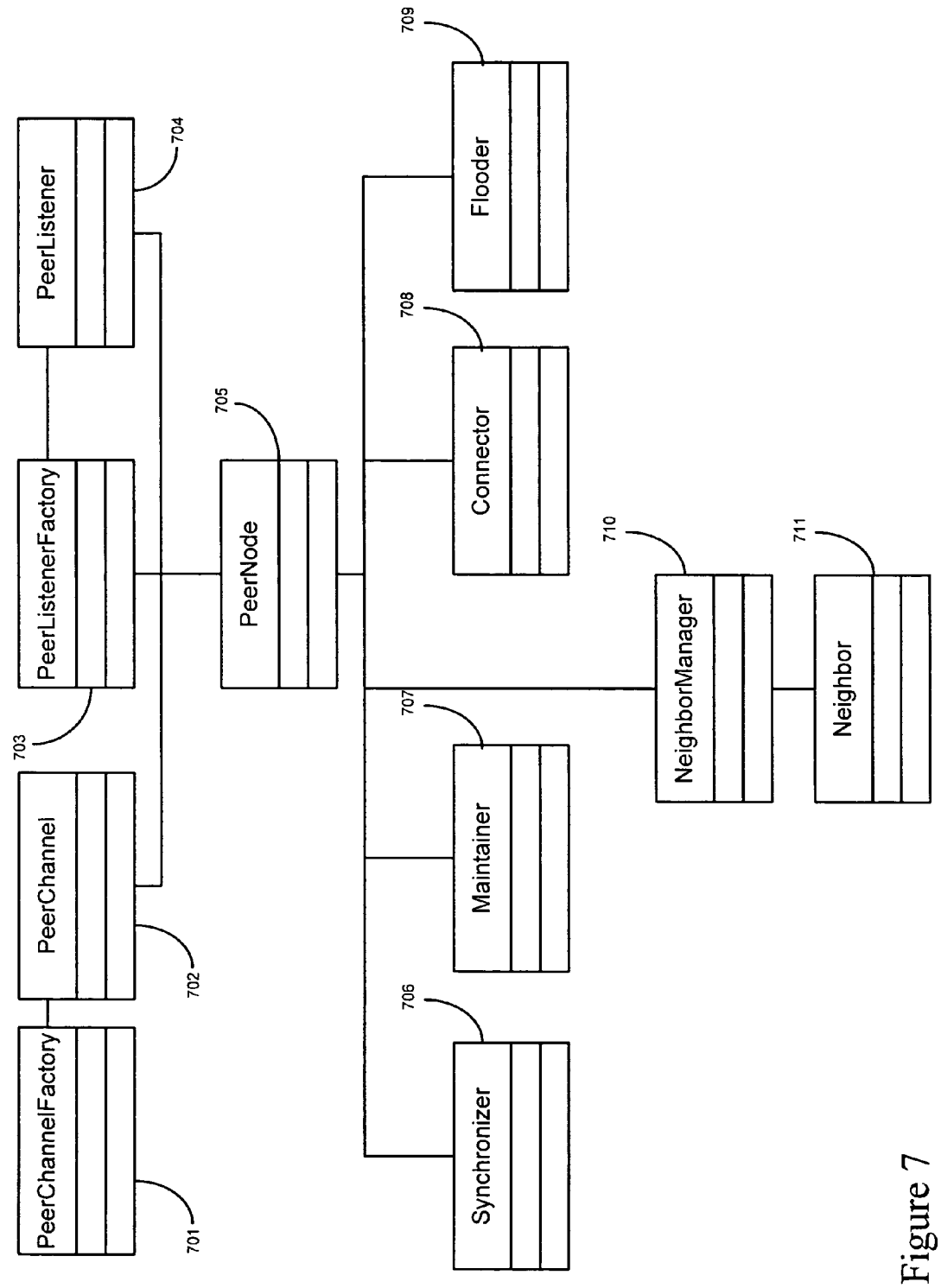
FIG. 7 illustrates a general object model for use in implementing the mesh in an embodiment of the claims.

FIG. 7 illustrates the objects that may implement an embodiment of the claimed system. The objects of the claimed multicast system may consist of a PeerChannel Factory 701, a PeerChannel 702, a PeerListenerFactory 703, a PeerListener 704, a PeerNode 705, a Synchronizer 706, a Maintainer 707, a Connector 708, a Flooder 709, a NeighborManager 710, and a Neighbor 711. Logically, the logical peer node described above may be implemented as the set of objects consisting of the PeerNode 705, Synchronizer 706, a Connector 708, a Maintainer 707, a Flooder 709, and a NeighborManager 710.

PeerChannelFactory 701 may be responsible for spawning PeerChannels 702. The PeerChannelFactory 701 may also maintain a collection of active channels that it creates. The PeerChannelFactory 701 may not be directly associated with a PeerNode 705, but looks them up or creates them as required.

A PeerListenerFactory 703 object may be responsible for spawning PeerListeners 704. The PeerListenerFactory 703 manages the active listeners and maintains a collection of active channels that the listeners have spawned. A PeerListenerFactory 703 may be associated with exactly one PeerNode 705.

A PeerNode 705 may represent a node in a mesh and contains its associated configuration. The PeerNode 705 may be the owner of all the internal components which implement the node. This class may also contain static methods for looking up existing nodes.

A Neighbor 711 may contain an underlying neighbor channel and tracks the state of the channel. The Neighbor may expose methods for communicating with the neighbor node.

NeighborManager 710 may contain a collection of Neighbors 711. The NeighborManager 710 may expose events which are aggregates of all Neighbors 711 (e.g. MessageAvailable). This object may provide the implementation of a peer node service.

A Connector 708 object may handle sending and receiving connection messages (CONNECT, WELCOME, REFUSE, DISCONNECT).

A Maintainer 707 object may implement the mesh maintenance algorithms. The Maintainer 707 may contain the mesh signature, collection of known mesh nodes, and collection of current mesh contacts.

A Flooder 709 may implement flooding logic. The Flooder may contain a table of recently seen messages.

A Synchronizer 706 may coordinate a light-weight contact/signature synchronization protocol over a neighbor channel.

Mesh Construction

A mesh may be identified by a name, or a mesh ID. A mesh ID is a valid hostname (e.g., soccerpals) that may be resolved to an IP address, (e.g., 123.12.123.12). An address of a service on the mesh may be designated by a uniform resource identifier ("URI") and is specified using the peer channel schema prefix (net.p2p://), a mesh ID, a path, and a service name (e.g., net.p2p://soccerpals/path/service). An EndpointAddress structure may be used to reference services in a mesh and may consist, in part, of at least one URI.

Figure 8:
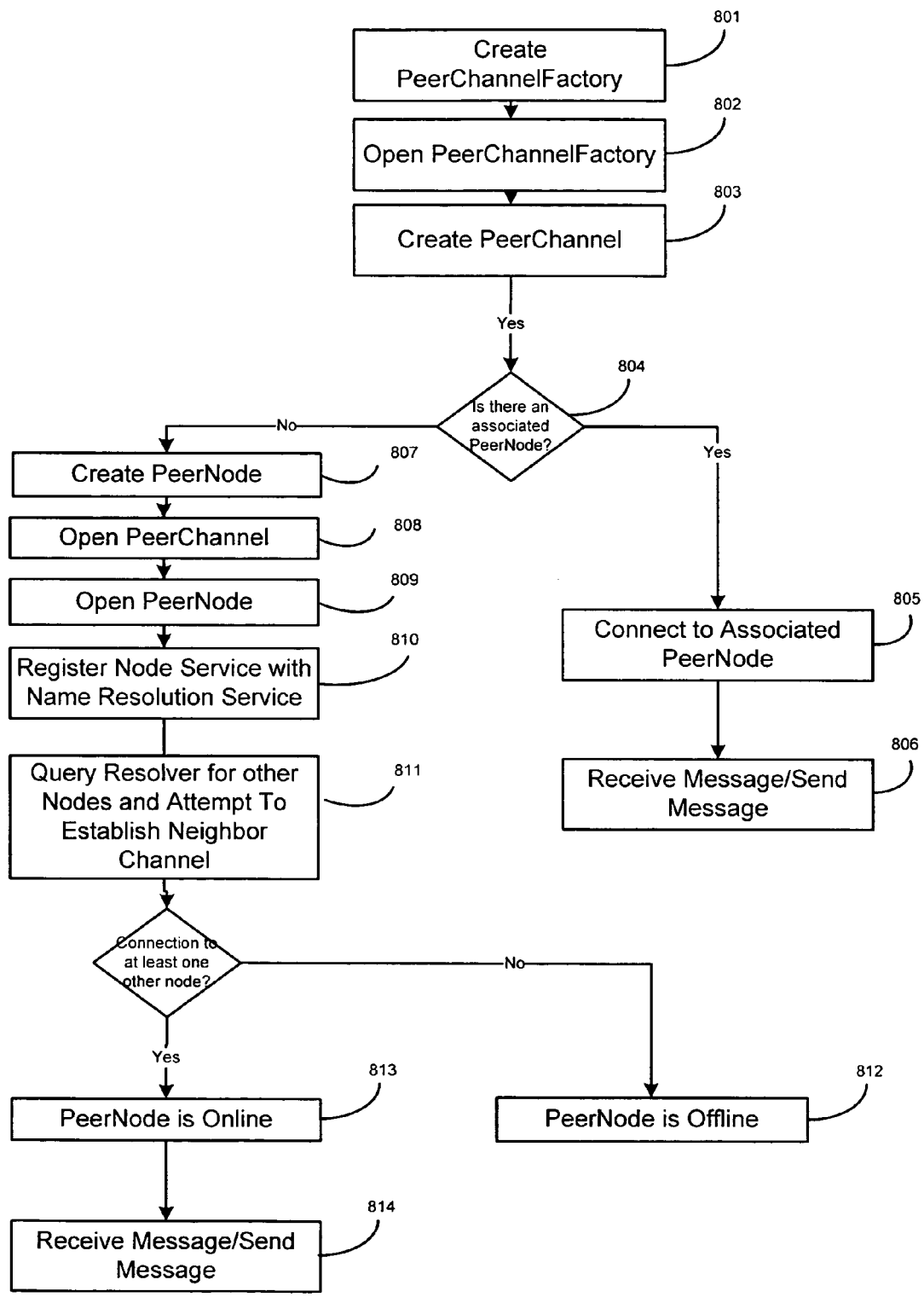
FIG. 8 illustrates a general flowchart for creating a mesh in an embodiment of the claims.

FIG. 8, illustrates a process for creating a mesh using the object model embodiment of the claims. (The following description will refer to objects of the claimed system as described above using their above enumerated names, e.g., PeerNode, PeerChannel, etc.)

Generally, anytime a service or client desires to communicate with a mesh, that service or client may be required to communicate through a PeerNode of the mesh Specifically, services may be associated with a PeerListenerFactory and clients may be associated with a PeerChannelFactory. This process may involve an application first creating 801 and opening 802 a PeerChannelFactory. The PeerChannelFactory may be instantiated as an object within the application, and therefore, may be associated with the application. Next a PeerChannel may be created 803 by calling a method on the PeerChannelFactory, which may be called CreateChannel. The PeerChannel may then check to see if there is an associated PeerNode 804. If there is an associated PeerNode, the PeerChannel may connect to that PeerNode and open the PeerChannel 805, and begin receiving and sending messages 806. Otherwise, if there is no existing PeerNode, the PeerChannel may create a new PeerNode 807, open the PeerChannel 808 (e.g., by calling an OPEN function on the PeerChannel and passing in an EndpointAddress), and open the new PeerNode 809.

In opening a new PeerNode, the PeerNode may call a Resolver object which is responsible for providing a name resolution service. There may be numerous Resolver methods including RegisterMeshID, UnregisterMeshID, etc. The Resolver method may implement a custom name resolution service or may use a Message Bus-provided resolution service such as Peer Name Resolution Protocol ("PNRP"). The newly created PeerNode may call the Resolver to register a node service 810, which is a service that is uniquely provided by each PeerNode for internal implementation purposes. This node service may be different from the application service that initiated the creation of the new PeerNode or that initiated the connection to an existing PeerNode. By registering with the Resolver, other nodes may obtain a reference to the newly created PeerNode, via its node service reference.

In addition to registering its node service, a PeerNode may query the Resolver for other nodes in the mesh 811. Without calling the resolver's ResolveMeshId method, a node may not know if there are other nodes in the mesh (unless one of the other nodes initiates a connection to this node). If there are no other nodes, the PeerNode may raise an indication to the PeerChannel, which raises an alert to the Application. If there are other nodes, the PeerNode may calls its Maintainer object to resolve the mesh ID into a EndpointAddress of a remote node service. Once the EndpointAddress is obtained, the NeighborManager may be used to create a NeighborChannel to the NeighborNode 811. Once the NeighborChannel is created, a connection may be attempted by sending a CONNECT message 812. If a WELCOME message is received, the PeerNode may be opened and online, and a synchronization process begins. If the REFUSE message is received, the PeerNode may attempt additional connections. If the PeerNode does not find or connect to any other nodes, the PeerNode may set itself to an offline state 813, otherwise the PeerNode may be online 814, and may receive and send messages 815.

Generally, the process above may be similar for a PeerListener process except for the initial channel creation block. When dealing with a service that is only interested in communicating with the mesh after being solicited by a message targeted to that service, the service may create and open a PeerListenerFactory, instead of a PeerChannelFactory. The PeerChannel may then be used to create a PeerListenerFactory. When the first message is received by a PeerNode matching the filter criteria, the PeerListener may spawn a PeerChannel. Once the PeerChannel is created, two-way communications may be made similar the process described above. A PeerListener, however, may also be configured with a message filter such that it only notifies the application for messages matching the filter criteria.

When the application wants to flood a message, it may communicate with a PeerNode through its PeerChannel. The peer channel may notify the application whenever a message is available for it. Alternatively, if the implementation uses a PeerListener, the PeerListener may generate a PeerChannel and notify the application that a message has been received for it. Once a PeerChannel is created, the application may receive and process it.

Each PeerNode may have a single associated NeighborManager. The NeighborManager may be limited to a delivery and reception role and may be tasked with maintaining a list of all its immediate neighbors, i.e., PeerNodes directly connected to it, and for collecting messages directed to it and sending messages from the PeerChannels that belong to a PeerNode.

Neighbor Receives Connection Request

Figure 9:
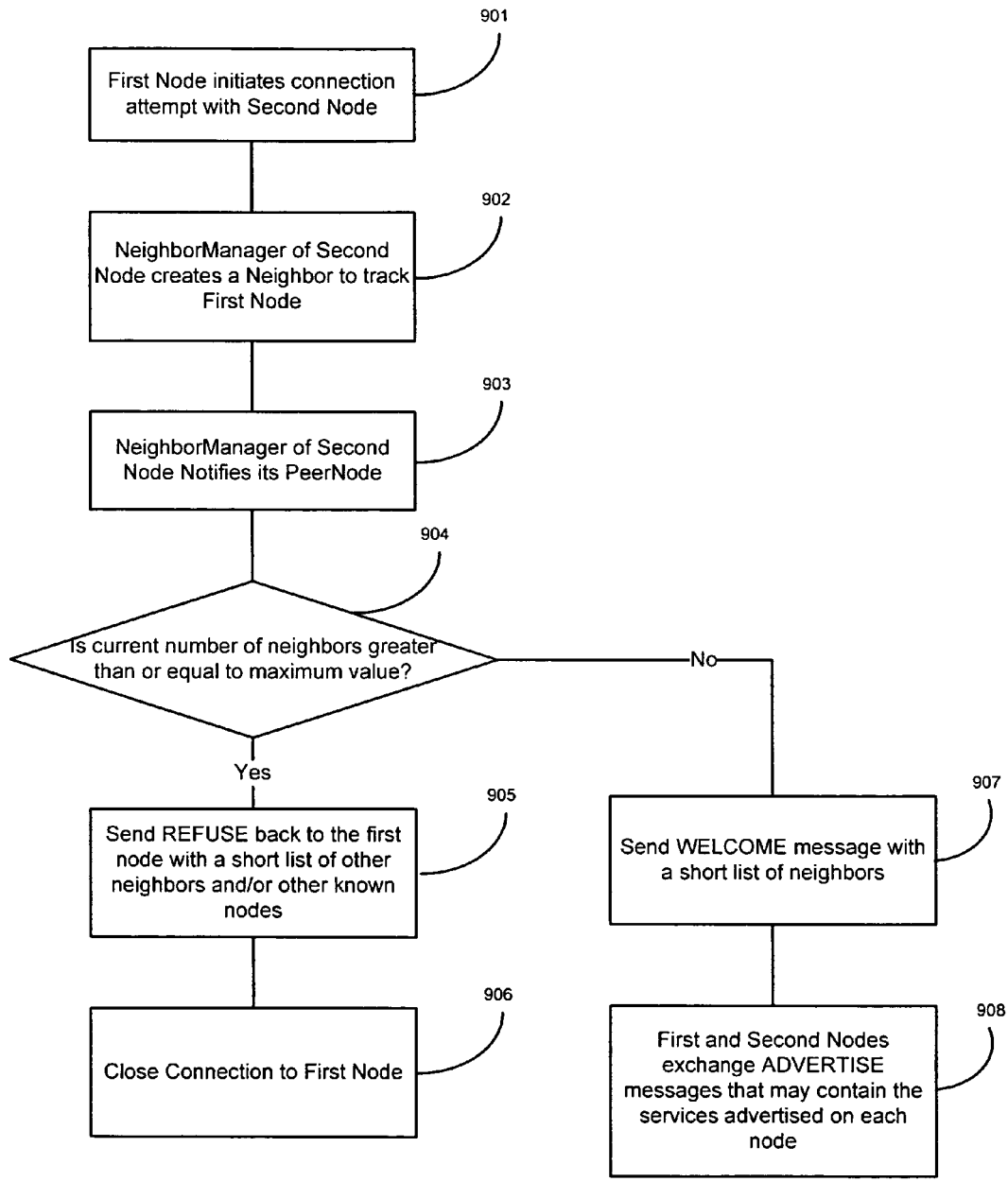
FIG. 9 illustrates a neighbor connection process in an embodiment of the claims.

FIG. 9 illustrates the scenario of handling neighbor connections. When a first node initiates a connection to a second node 901, the NeighborManager of the second node may be notified and may create a Neighbor object to track the remote first node 902. The NeighborManager may notify its PeerNode 903, representing the second neighbor node, which in turn notifies the Connector. The first node's Connector starts a Connect protocol with the second node by sending a CONNECT message. The responding Connector may then send a response to the initiating node according to the following:

If the current number of neighbors is greater than or equal to a maximum value (described further in Mesh Maintenance section below), a REFUSE message may be sent back to the neighbor with a short list of neighbors and/or other known nodes 905 and the channel is closed 906. Otherwise a WELCOME message may be sent with a short list of neighbors and/or known nodes 907.

If the channel has not been closed by the above process, the nodes may exchange ADVERTISE messages that may contain the services advertised on each node 908.

Synchronizing a Node

When a neighbor connects to another node on the mesh, the current state of the mesh may be required to be synchronized to ensure that all nodes share the same view of the mesh. This state includes a list of mesh contact nodes, along with a mesh signature (which is used for internal mesh maintenance functions, to be described below).

Peer Synchronizer may be a component of a PeerNode that is responsible for running the synchronization protocol between a pair of neighboring nodes. The synchronization process may involve the following steps which are illustrated in FIG. 10. At block 1000, when a neighbor transitions to Connected state, the initiating Synchronizer may start the sync process by sending a SyncRequest message. The SyncRequest message may contain a list of abstracts of the contacts in the Maintainer's contact cache and the signature. Each contact abstract may contain the node ID of the contact node and the version number of the contact. For a new node, this list may be empty.

At block 1005, upon receiving the SyncRequest message, the responding Synchronizer may hand over the list of abstracts to a Maintainer. The Maintainer may implement the mesh maintenance algorithms and may contain the mesh signature, collection of known mesh nodes and collection of current mesh contacts. At block 1010, the Maintainer, in turn, may compare the abstract list with the contents of its contact cache. At block 1015, the Maintainer may build a list of contacts that are present in its cache but missing from the abstract list (i.e., the initiating node does not have them) and adds the contacts that are newer than the ones in the abstract list. At block 1020, an updated abstract is created. Any contacts that are missing from the responder's cache are added or if the responder has an older version, the Maintainer may add them into a new, updated abstract list. At block 1025, the contact list, the signature, and the new abstract list may be returned to the Synchronizer.

At block 1030, if the abstract list returned by the Maintainer is non-empty, control may pass to block 1035 where the responding Synchronizer sends its own SyncRequest message with this abstract list and the Signature. At block 1040, the Synchronizer may send a series of SyncData messages with the contacts. The final contact chunk and the signature may be are sent in the SyncEnd message. If at block 1030 the abstract list returned by the Maintainer is empty, the Sychronizer may not send its own SyncRequest and control may pass to block 1040.

At block 1043, on the initiating side, a determination may be made whether the initiating side sent a SyncRequest of its own. If the initiator did not send a SyncRequest, the end of synchronization process may be signaled at block 1045 when all the SyncData and the SyncEnd messages are sent. If the initiator did send its own SyncRequest, the synchronization process may end when and when the SyncEnd message is received at block 1050.

At block 1055, on the responding side, a determination may be made whether the responding side sent a SyncRequest of its own. If the responder did not send a SyncRequest, the end of synchronization process may be signaled at block 1060 when all the SyncData and the SyncEnd messages are sent. If the responder did send its own SyncRequest, the synchronization process may end when and when the SyncEnd message is received at block 1065.

FIG. 11 may illustrate the exchange of various synchronization related messages between a pair of neighbors, where the initiator is the new node. FIG. 12 may illustrate the synchronization process between a pair of existing nodes in the mesh. FIG. 13 may illustrate the synchronization process between an existing node and a new node, where the existing node is the initiator.

Sending/Flooding a Message

FIG. 14 illustrates the scenario of flooding a message. When the application wants to send a message 1401, it may call a send method of the PeerChannel method 1402, the PeerChannel may call the PeerNode 1403, which may call the Flooder to send the message 1404. The ID of the inner message may be added to the Flooder's message table 1405, and the Flooder may encapsulate the inner message into an outer tunneling message 1406 and send the message to all neighbors as a tunneling message 1407. The outer tunneling message may be used only for communication on neighbor channels, without alteration to the inner application message. Tunneling may be done in order to maintain the integrity of the inner message for handling and delivery only by internal peer node components, while providing encapsulation headers and delivery mechanisms for handling by the neighbor channels. This may effectively isolate transport mechanisms between the two pathways.

Receiving a Message

FIG. 15 illustrates the scenario of receiving a message. When a message is received on a NeighborChannel associated with a PeerNode 1501, the NeighborManager may notify the PeerNode 1502, which may call its Flooder 1503 to process the message according to its type.

For all flooded messages, the inner message may be extracted from the outer tunneling message 1504. The PeerNode may call the Flooder to determine if the inner message has been seen before 1505. If it has, the message may be closed and processing is complete 1506. If the inner message has not completed propagating through the mesh (i.e., the message should be flood further), further processing may occur.

If the inner message is an internal message for processing mesh functions 1507, a PeerNode may forward the message to its correct internal node object (e.g., Maintainer) 1508. These components process the message as described further below. For signature messages, the Maintainer may determine that the message should stop flooding further 1509, at which point the message is closed and processing may be complete 1506. Otherwise, the inner message's ID may be added to the Flooder's message table 1516 and the inner message may be re-encapsulated by the Flooder into another outer tunneling message and sent to all neighbors except the neighbor from which the original message was received 1517.

If the inner message is an application message 1510, the PeerNode may search for a channel object 1511 (e.g., a Peer-Channel or a PeerListener) associated with the message's destination service. If a matching PeerChannel is found, the message may be sent to the application/service 1512 associated with the PeerChannel. Otherwise, if a matching PeerListener is found, a new PeerChannel may be created to the application/service 1513 by calling AcceptChannel or BeginAcceptChannel and the message may be sent to the corresponding application.

the inner message is not an application message 1510 the inner message's ID may be added to the Flooder's message table 1516 and the inner message may be re-encapsulated by the Flooder into another outer tunneling message and sent to all neighbors except the neighbor from which the original message was received 1517. Additional flood pruning logic may be implemented in this process as well 1514, 1515. For example, some applications may implement a propagation filter interface object 1514 (which may be called a IPeerMessagePropagationFilter interface) associated with the Flooder to determine if a message should be flooded further. If the Flooding filter interface determines that there should be no further flooding, processing is complete 1515.

Closing a Portion of the Mesh

The following are events that may occur in which a portion of the mesh may be disassembled, or closed.

Neighbor Initiated Disconnect: If a neighbor disconnects cleanly, the neighbor may send a DISCONNECT message. This message may be handled by the Connector, which closes the neighbor channel. When the neighbor channel closes (either abruptly or via a formal disconnect process), the NeighborManager may notify the other internal node components. The Maintainer may handle this event by performing a mesh maintenance algorithm (described below). The PeerNode may handle this event by notifying the application that the services advertised by the remote node are no longer available. If this was the only neighbor connection, the node may now be offline.

PeerNode Initiated Disconnect: A neighbor may be disconnected locally (e.g., by the PeerNode) either because the peer node is closing or because the Maintainer chooses to prune the connection. When a neighbor is closing, the local components may be notified. The Connector may handle this event by sending a DISCONNECT message to the neighbor. Once the Neighbor is closed, the application may be notified that the remote node's advertised services are no longer available.

Closing a PeerChannel: When a channel is closed, it may be removed from the owning factory's channel collection and the reference to the associated PeerNode is released.

Advertising a Service

One advantage of the claimed mesh system is that it may allow an application to use the mesh to locate services which the application can then consume. In order to enable access to the services offered by various nodes on the mesh, applications may need to first retrieve information about its neighbors. In particular, an application may need to be able to enumerate services advertised on its neighbors.

To advertise a local service to neighbor nodes, the application may call an AddAdvertisedAddresses function of the PeerNode, specifying the local application service's EndpointAddress. This may cause the Maintainer to add this service to its currently advertised list and send an ADVERTISE message to neighbors containing the updated advertised service list. Similarly, an application may un-advertise a service by calling a RemoveAdvertisedAddresses function of the PeerNode.

When the application advertises its service addresses, this information is cached by the node and sent to neighbors. On receiving this information, an event may be raised. This event may provide the application with the neighbor's node ID and all the EndpointAddresss advertised on that node.

By advertising the addresses of an application's services, an application can open a channel directly to the neighbor's application service, thereby enabling a private communication channel. To send a message to a neighbor (rather than sending a message to the entire mesh), the application may be required to retrieve the list of advertised services on the neighboring node and decide which service to send to. To find this list of services, the application may call a function of the PeerNode to retrieve the advertised services, which may be called GetNeighborAdvertisedAddresses, which collects the cached service information. The method returns a collection of EndpointAddresss to services advertised on the neighboring nodes along with the neighbors' node IDs.

The application may select one of these EndpointAddresss, and may use a channel of the underlying Message Bus (e.g., http, tcp, etc.—not a PeerChannel) to create a channel to the service. The application may use this channel to directly communicate (off-mesh) with the neighbor's service.

Mesh Maintenance

FIG. 16 illustrates a mesh maintenance process in an embodiment of the claims. Mesh connections may be determined by three parameters which may be called cIdealNeighbors, cMaxNeighbors, cMinNeighbors. A node may maintain a count of the number of neighbor nodes connected 1601. A node may attempt to maintain approximately cIdealNeighbors connections to other nodes at any given time. A node may not establish a new outgoing connection or accept a new incoming connection if it currently has cMaxNeighbors 1602, and will send a REFUSE message 1603 to any nodes attempting to connect to it. If the number of connections is below cMinNeighbors at any time 1604, the node may attempt to establish more connections. The node may WELCOME pending channel requests 1605, 1606 or a node may use the list of known nodes that was communicated to it by its neighbors 1607 (via the WELCOME, REFUSE, and DISCONNECT messages). If this list is insufficient, it may attempt to resolve the mesh ID to a new node (e.g., by opening a new channel, as described above).

The values for cIdealNeighbors, cMaxNeighbors, and cMinNeighbors may depend on a variety of factors including mesh size and mesh traffic. Because a cMinNeighbors value of one may cause a complete separation if the one and only connection is lost, a cMinNeighbors value of at least two may be appropriate for any mesh. A high value of cMaxNeighbors may mean that a particular node is doing a very disproportionate amount of flooding on behalf of other nodes. A cIdealNeighbors value between cMinNeighbors nad cMaxNeighbors may be based on good redundancy, with minimum overhead.

Each node in the mesh may attempt to maintain the most useful set of connections as possible, where a connection's usefulness may be determined by the amount of unseen messages sent on it (in either direction). Periodically, when a node has more than the cIdealNeighbors 1608, it may disconnect the least useful connection 1609.

Each node may have a node ID, which is a random 64-bit number. The mesh has a signature which may be computed as the lowest node ID present in the mesh. The computation may be done by having the node with the lowest node ID publish its ID as the signature. However, a node may not directly know that it has the lowest ID, so all nodes may attempt to publish their ID. A node may not publish if the mesh signature is already lower than their ID. Also, each node may have a backoff period before publishing which may be exponentially proportional to its node ID, thereby helping to reduce the number of incorrect signature publications.

The mesh may have a set of contact nodes, which may be responsible for periodically publishing the signature of the mesh as they see it. Whenever a node's view of the mesh signature becomes out of sync with the view that the contacts publish 1610, the node may know that the mesh has been partitioned, and may attempt to reconnect 1611, after a random backoff period, to one of the contacts that is out of sync. There is a small chance that this procedure may not detect a partition. To mitigate this, contact nodes may periodically attempt to resolve the mesh ID to a new (random) node and form a connection.

APIs

FIG. 17 may be an illustration a method in accordance with the claims. The method 1700 may be used in a peer networking enabled computer adapted to be part of a network of computing devices interoperating via a peer networking protocol having an implementation of a peer networking protocol.

The success of a peer-to-peer protocol may depend on the protocol's ability to establish valid connections between selected entities. Likewise, the formation of groups in such a peer to peer network relies on this ability. However, one skilled in the art will recognize from the following teachings that the methods of the present invention are not limited to the particular peer-to-peer protocol.

The method 1700 may be embodied in an application programming interface for a software program that implements a set of device services. The methods may be part of a peer listening factory that sets up a peer listener and part of a peer channel factory that sets up a peer channel as explained previously. At block 1710, the method may serve requests for a maximum number of services to advertise to other computing devices on the peer network. A default value may be 25, for example. Services may be thought of as being computer programs or computer experiences for a user. Members of a group may not need to know about all the services available from every computing device in the group because excessive advertisement may clog up a network unnecessarily. The number of services to be advertised may be arbitrary or may be based on a formula such as in a smaller group with limited network traffic, more services may be advertised while in a larger network with more network traffic, fewer services may be advertised. In addition, the number of services may be advertised may be set. The number may be set by another member of the network or by an administrative member of the network. A sample computer code implementation may be as follows:

public int MaxAdvertisedAddressesPerNeighbor { get; set; }.

At block 1720, requests to determine if a message should be propagated to additional computing devices on the peer network may be served. The determination may also be though of as a filter on which messages should be passed on to other computing devices on the network. The filter may have a limitless number of settings such as whether the message has been received previously, whether the message has an intended recipient that the receiving computer recognizes, whether network traffic is high, whether the message is recent or old, etc. The default value may be no filter meaning that all messages are forwarded. The filter may also be set. For example, if computer device known to the recipient goes off line and a message is received for that known computer device, then the filter may be set to not forward the message. A sample computer code implementation may be as follows:

public IPeerMessagePropagationFilter MessagePropagationFilter { get; set; }

At block 1730, requests for a port number used to contact a computing device on the peer network may be served. Ports may be used to communicate messages to the network and different computing devices on the network may use different ports. Block 1740 may supply the port the computing device is using to send and/or receive messages to other members on the network. A default may be that the underlying transport (i.e., TCP, HTTP) selects the port. In addition, the port of computing device used to communicate with the network may be set. The port may be set by another member of the network or my an administrative member of the network. A sample computer code implementation may be as follows:

public Nullable<int>NeighborServicePort { get; set; }

At block 1740, request for a transport method used to contact computing device on the peer network may be served. A variety of transport methods may be available such HTTP or TCP. In addition, the transport method of the computing device to may be set. The transport method may be set by another member of the network or by an administrative member of the network. A sample computer code implementation may be as follows:

public Transport NeighborServiceTransport { get; set; }

At block 1750, requests regarding which resolver to use may be served. Because a particular user may connect to the network in various ways at various locations having different addresses, a unique identity may be assigned to the user or the group. This address may then need to be resolved such that the identity is tied to a particular address or addresses through the protocol. One such peer-to-peer name resolution protocol is Peer Name Resolution Protocol ("PNRP"). For example, the resolver may convert a network address to a mesh id using PNRP. However, one skilled in the art will recognize from that the methods of the present invention are not limited to the particular peer-to-peer protocol, but may be applied to other protocols with equal force. In addition, the resolver used by the computing device may be set. The resolver may be set by another member of the network or by an administrative member of the network. A sample computer code implementation may be as follows:

public IPeerResolver Resolver { get; set; }

From the above description, the method and system of the claims may enable an application developer using a service oriented application framework to integrate multicast functionality with ease and convenience using the peer node objects. Using this framework, services having multicast functionality may be created without concern for TCP/IP or other underlying, lower-level communication protocols, because the peer node objects manage messaging using whatever protocol is available. An advantage of this system may be that meshes may be created that span the entire Internet, whereas multicast IP requires certain multicast IP enabled segments of the Internet (e.g., the "Mbone") in order to operate. The claimed system also provides an application based filtering mechanism in which the flow of messages may be intelligently controlled using filter interfaces (e.g., message suppression may be useful in making the mesh more efficient and secure), which an IP multicast solution does not provide.

Further, because the claimed system is built on top of a services oriented framework, application developers may not need to concern themselves with programming from scratch a multicast solution, they only need to worry about what multicast functionality they would like to implement as part of their services. The peer node object model provides a base infrastructure so that developers can concentrate on developing multicast enabled services. The described APIs also will make programming easier.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. In a peer networking enabled computer adapted to be part of a network of computing devices interoperating via a peer networking protocol having an implementation of a peer networking protocol, an application programming interface for a software program that implements a set of device services comprising:
   serving requests for a maximum number of services to advertise to other computing devices on the peer network;
   serving request to determine if a message should be propagated to additional computing devices on the peer network;
   serving requests for a port number associated with a port object used to contact a computing device on the peer network;
   serving requests for a transport method used to contact the computing device on the peer network; and
   serving requests regarding which resolver to use;
   wherein the port object is configured to receive a message from an application code, via a channel object associated to the port object, to initiate the request for the port number.

2. The application programming interface of claim 1, wherein the resolver converts mesh id to a network address using pnrp.

3. The application programming interface of claim 1, further comprising allowing the setting of the maximum number of services to advertise to other computing devices on the peer network.

4. The application programming interface of claim 1, further comprising allowing the setting of a filter to determine if a message should be propagated to additional computing devices on the peer network.

5. The application programming interface of claim 1, further comprising allowing the setting of the port number used to contact a computing device on the peer network.

6. The application programming interface of claim 1, further comprising allowing the setting of the transport method used to contact computing device on the peer network.

7. The application programming interface of claim 1, further comprising allowing the setting of the resolver to use.

8. A computer readable medium having computer executable instructions for use in a peer networking enabled computer adapted to be part of a network of computing devices interoperating via a peer networking protocol having an implementation of a peer networking protocol, providing an application programming interface for a software program that implements a set of device services comprising:
   computer executable instructions for serving requests for a maximum number of services to advertise to other computing devices on the peer network;
   computer executable instructions for serving request to determine if a message should be propagated to additional computing devices on the peer network;
   computer executable instructions for serving requests for a port number associated with a port object used to contact a computing device on the peer network;
   computer executable instructions for serving requests for a transport method used to contact the computing device on the peer network; and
   computer executable instructions for serving requests regarding which resolver to use;
   wherein the port object is configured to receive a message from an application code, via a channel object associated to the port object, to initiate the request for the port number.

9. The computer readable medium of claim 8, wherein the resolver converts mesh id to a network address using pnrp.

10. The computer readable medium of claim 8, further comprising computer executable instructions for allowing the setting of the maximum number of services to advertise to other computing devices on the peer network.

11. The computer readable medium of claim 8, further comprising computer executable instructions for allowing the setting of a filter to determine if a message should be propagated to additional computing devices on the peer network.

12. The computer readable medium of claim 8, further comprising computer executable instructions for allowing the setting of the port number used to contact a computing device on the peer network.

13. The computer readable medium of claim 8, further comprising computer executable instructions for allowing the setting of the transport method used to contact computing device on the peer network.

14. The computer readable medium of claim 8, further comprising computer executable instructions for allowing the setting of the resolver to use.

15. A computing apparatus, comprising:
   a display unit that is capable of generating video images;
   an input device;
   a processing apparatus operatively coupled to said display unit and said input device, said processing apparatus comprising a processor and a memory operatively coupled to said processor;

a network interface connected to a network and to the processing apparatus;

said processing apparatus being programmed to, in a peer networking enabled computer adapted to be part of a network of computing devices interoperating via a peer networking protocol having an implementation of a peer networking protocol, providing an application programming interface for a software program that implements a set of device services comprising:

serving requests for a maximum number of services to advertise to other computing devices on the peer network;

serving request to determine if a message should be propagated to additional computing devices on the peer network;

serving requests for a port number associated with a port object used to contact a computing device on the peer network;

serving requests for a transport method used to contact the computing device on the peer network; and serving requests regarding which resolver to use wherein the resolver converts mesh id to a network address using pnrp;

wherein the port object is configured to receive a message from an application code, via a channel object associated to the port object, to initiate the request for the port number.

16. The computing apparatus of claim 15, further comprising the processing apparatus being programmed to allow the setting of the maximum number of services to advertise to other computing devices on the peer network.

17. The computing apparatus of claim 15, further comprising processing apparatus being programmed to allow the setting of a filter to determine if a message should be propagated to additional computing devices on the peer network.

18. The computing apparatus of claim 15, further comprising processing apparatus being programmed to allow the setting of the port number used to contact a computing device on the peer network.

19. The computing apparatus of claim 15, further comprising processing apparatus being programmed to allow the setting of the transport method used to contact computing device on the peer network.

20. The computing apparatus of claim 15, further comprising processing apparatus being programmed to allow the setting of the resolver to use.

* * * * *

UNITED STATES PATENT AND TRADEMARK OFFICE
CERTIFICATE OF CORRECTION

PATENT NO.       : 7,493,413 B2
APPLICATION NO.  : 11/080897
DATED            : February 17, 2009
INVENTOR(S)      : Ashish Gupta et al.

It is certified that error appears in the above-identified patent and that said Letters Patent is hereby corrected as shown below:

In column 15, line 18, before "the" insert -- If --.

Signed and Sealed this
Third Day of May, 2011

David J. Kappos
*Director of the United States Patent and Trademark Office*